(12) United States Patent  
McMillen et al.

(10) Patent No.: US 9,193,280 B2  
(45) Date of Patent: *Nov. 24, 2015

(54) LUMBAR SUPPORT SYSTEM

(71) Applicant: Leggett & Platt Canada Co., Halifax (CA)

(72) Inventors: Robert J. McMillen, Tecumseh (CA); Horia Blendea, LaSalle (CA); Paul Tindall, Harrow (CA)

(73) Assignee: LEGGETT & PLATT CANADA CO., Halifax, Nova Scotia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,122

(22) Filed: Jan. 15, 2014

(65) Prior Publication Data

US 2014/0125102 A1    May 8, 2014

Related U.S. Application Data

(63) Continuation-in-part of application No. 13/840,928, filed on Mar. 15, 2013, which is a continuation-in-part of application No. 13/614,154, filed on Sep. 13, 2012.

(51) Int. Cl.
*B60N 2/66* (2006.01)
*B60N 2/22* (2006.01)
*B60N 2/02* (2006.01)

(52) U.S. Cl.
CPC .. *B60N 2/22* (2013.01); *B60N 2/02* (2013.01); *B60N 2/66* (2013.01)

(58) Field of Classification Search
CPC ........................................... B60N 2/66
USPC ........................................... 297/284.4
See application file for complete search history.

(56) References Cited

U.S. PATENT DOCUMENTS

| 3,273,877 A | 9/1966 | Geller et al. |
| 3,608,960 A | 9/1971 | Sherman |
| 3,807,794 A | 4/1974 | Beyer |

(Continued)

FOREIGN PATENT DOCUMENTS

| CA | 1126148 | 6/1982 |
| DE | 3145217 | 5/1983 |

(Continued)

OTHER PUBLICATIONS

U.S. Patent and Trademark Office Action received in U.S. Appl. No. 13/614,154, dated Oct. 8, 2014 (7 pages).

(Continued)

*Primary Examiner* — David R Dunn
*Assistant Examiner* — Timothy J Brindley
(74) *Attorney, Agent, or Firm* — Michael Best & Friedrich LLP

(57) ABSTRACT

An adjustable support system for a seat having a fixed frame includes a support movable from a first position to a second position relative to the frame. An actuator is coupled to only the support and is configured to move the support between the first and second positions. A member is operatively associated with and movable by the actuator. A flexible cable has a first end coupled to the member for travel along the length of the member and a second end coupled to the fixed frame such that movement of the member by the actuator causes the flexible cable to move the support between the first position and the second position.

14 Claims, 38 Drawing Sheets

(56) References Cited

U.S. PATENT DOCUMENTS

| | | |
|---|---|---|
| 4,072,287 A | 2/1978 | Swenson et al. |
| 4,295,681 A | 10/1981 | Gregory |
| 4,354,709 A | 10/1982 | Schuster |
| 4,462,635 A | 7/1984 | Lance |
| 4,531,779 A | 7/1985 | Hashimoto |
| 4,602,819 A | 7/1986 | Morel |
| 4,636,000 A | 1/1987 | Nishino |
| 4,678,230 A | 7/1987 | Winkle |
| 4,811,986 A | 3/1989 | Hattori et al. |
| 4,880,271 A | 11/1989 | Graves |
| 4,981,325 A | 1/1991 | Zacharkow |
| 4,987,788 A | 1/1991 | Bausch et al. |
| 5,026,116 A | 6/1991 | Dal Monte |
| 5,050,930 A | 9/1991 | Schuster et al. |
| 5,078,449 A | 1/1992 | Suzuki |
| 5,217,278 A | 6/1993 | Harrison et al. |
| 5,314,236 A | 5/1994 | Suzuki et al. |
| 5,344,211 A | 9/1994 | Adat et al. |
| 5,462,335 A | 10/1995 | Seyler |
| 5,466,045 A | 11/1995 | Akima |
| 5,507,559 A | 4/1996 | Lance |
| 5,518,294 A | 5/1996 | Ligon, Sr. et al. |
| 5,553,919 A | 9/1996 | Dennis |
| 5,590,744 A | 1/1997 | Belmond |
| 5,609,394 A | 3/1997 | Ligon, Sr. et al. |
| D383,928 S | 9/1997 | Earleywine, Jr. |
| 5,681,005 A | 10/1997 | Ligon, Sr. et al. |
| 5,685,606 A | 11/1997 | Lance |
| 5,769,490 A | 6/1998 | Falzon |
| 5,788,328 A | 8/1998 | Lance |
| 5,797,652 A | 8/1998 | Darbyshire |
| 5,823,620 A | 10/1998 | Le Caz |
| 5,842,659 A | 12/1998 | Ligon, Sr. et al. |
| 5,857,743 A | 1/1999 | Ligon, Sr. et al. |
| 5,934,752 A | 8/1999 | Klingler |
| 5,967,608 A | 10/1999 | Van Sickle |
| 5,984,407 A | 11/1999 | Ligon, Sr. et al. |
| 5,988,745 A * | 11/1999 | Deceuninck ............... 297/284.4 |
| 6,045,185 A | 4/2000 | Ligon, Sr. et al. |
| 6,050,641 A | 4/2000 | Benson |
| 6,068,336 A | 5/2000 | Schonauer |
| 6,227,618 B1 | 5/2001 | Ligon, Sr. et al. |
| 6,254,186 B1 | 7/2001 | Falzon |
| 6,270,158 B1 | 8/2001 | Hong |
| 6,296,308 B1 | 10/2001 | Cosentino et al. |
| 6,375,262 B1 | 4/2002 | Watanabe |
| 6,412,868 B1 | 7/2002 | Kuster |
| 6,499,803 B2 | 12/2002 | Nakane et al. |
| 6,575,530 B1 | 6/2003 | Fischer et al. |
| 6,631,951 B2 | 10/2003 | Blendea et al. |
| 6,676,214 B2 | 1/2004 | McMillen et al. |
| 6,692,074 B1 | 2/2004 | Kopetzky |
| 6,779,844 B2 | 8/2004 | Dosen et al. |
| 6,880,424 B2 | 4/2005 | McMillen |
| 6,893,089 B2 | 5/2005 | McMillen et al. |
| 6,905,170 B2 | 6/2005 | McMillen et al. |
| 6,908,153 B2 | 6/2005 | Blendea |
| 6,918,634 B2 | 7/2005 | Elliot |
| 6,938,955 B2 | 9/2005 | VanSickle |
| 7,011,369 B2 | 3/2006 | Massara et al. |
| 7,083,232 B2 | 8/2006 | Frank |
| 7,131,694 B1 | 11/2006 | Buffa |
| 7,140,681 B2 | 11/2006 | McMillen |
| 7,425,036 B2 | 9/2008 | McMillen |
| 7,429,080 B2 | 9/2008 | Walker et al. |
| 7,488,039 B2 | 2/2009 | Fischer et al. |
| 7,517,024 B2 | 4/2009 | Cvek |
| 7,549,700 B2 | 6/2009 | Blendea |
| 7,690,727 B2 | 4/2010 | Fischer et al. |
| 7,770,972 B2 | 8/2010 | Popa |
| 7,823,975 B2 | 11/2010 | Prause et al. |
| 7,862,119 B2 | 1/2011 | Schäfer et al. |
| 7,971,934 B2 | 7/2011 | LaPointe et al. |
| 7,997,650 B2 | 8/2011 | McMillen et al. |
| 8,091,966 B2 | 1/2012 | Schweizer et al. |
| 8,091,967 B2 | 1/2012 | Schweizer et al. |
| 2003/0111884 A1 | 6/2003 | Dosen et al. |
| 2003/0184139 A1 | 10/2003 | Sloan, Jr. |
| 2003/0227203 A1* | 12/2003 | Mundell ................... 297/284.4 |
| 2004/0108760 A1 | 6/2004 | McMillen |
| 2004/0140700 A1 | 7/2004 | McMillen et al. |
| 2004/0245824 A1* | 12/2004 | McMillen ................. 297/284.4 |
| 2005/0184200 A1 | 8/2005 | Schwarzbich |
| 2006/0103204 A1 | 5/2006 | Walker et al. |
| 2006/0273643 A1* | 12/2006 | McMillen ................. 297/284.4 |
| 2007/0102977 A1 | 5/2007 | Fischer et al. |
| 2007/0236062 A1* | 10/2007 | McMillen et al. ........ 297/284.4 |
| 2007/0236063 A1* | 10/2007 | Blendea ................... 297/284.4 |
| 2007/0296256 A1* | 12/2007 | Colja et al. .............. 297/284.4 |
| 2009/0079245 A1 | 3/2009 | Marcantoni |
| 2009/0174241 A1* | 7/2009 | Pattyn et al. ............. 297/284.4 |
| 2009/0184552 A1* | 7/2009 | Vanparys et al. ......... 297/284.4 |
| 2009/0236889 A1 | 9/2009 | Prause et al. |
| 2010/0066144 A1* | 3/2010 | Schweizer et al. ........ 297/284.8 |
| 2010/0156158 A1 | 6/2010 | LaPointe et al. |
| 2010/0268133 A1 | 10/2010 | Samain |
| 2011/0115268 A1 | 5/2011 | Maierhofer et al. |
| 2011/0266849 A1 | 11/2011 | Schwarze |
| 2012/0126600 A1* | 5/2012 | Samain et al. ............ 297/284.4 |
| 2014/0070583 A1 | 3/2014 | McMillen et al. |
| 2014/0070584 A1* | 3/2014 | McMillen et al. ........ 297/284.4 |
| 2014/0125103 A1* | 5/2014 | Suzuki ..................... 297/284.7 |

FOREIGN PATENT DOCUMENTS

| | | |
|---|---|---|
| DE | 3616155 A1 | 11/1987 |
| DE | 3619188 C1 | 12/1987 |
| DE | 4129934 | 3/1993 |
| DE | 10021508 A1 | 11/2001 |
| DE | 20309193 | 8/2003 |
| DE | 10021508 B4 | 2/2004 |
| DE | 10310488 | 7/2004 |
| DE | 102008047243 | 3/2010 |
| DE | 102010039353 | 2/2012 |
| DE | 102010061788 | 5/2012 |
| EP | 420824 A1 | 4/1991 |
| EP | 518830 A1 | 12/1992 |
| EP | 537839 A1 | 4/1993 |
| EP | 540481 A1 | 5/1993 |
| EP | 563709 A1 | 10/1993 |
| EP | 1663704 | 6/2006 |
| EP | 2039720 | 3/2009 |
| FR | 1543602 A | 10/1968 |
| GB | 2335843 A | 10/1999 |
| GB | 2335844 A | 10/1999 |
| JP | 51096658 A | 8/1976 |
| JP | 62066538 U | 4/1987 |
| JP | 5207920 | 8/1993 |
| JP | 6165718 A | 6/1994 |
| JP | 9327149 | 12/1997 |
| JP | 2002102011 A | 4/2002 |
| WO | 0164475 A1 | 9/2001 |
| WO | 2004049869 A2 | 6/2004 |
| WO | 2004089693 A2 | 10/2004 |

OTHER PUBLICATIONS

International Search Report and Written Opinion of the International Searching Authority, received for International Patent Application No. PCT/CA2013/000633, mailed Oct. 23, 2013 (10 pages).

U.S. Patent and Trademark Office Action received in U.S. Appl. No. 13/614,154, dated Feb. 6, 2015 (7 pages).

U.S. Patent and Trademark Office Action received in U.S. Appl. No. 13/840,928, dated Feb. 13, 2015 (8 pages).

International Search Report and Written Opinion of the International Searching Authority for Application No. PCT/CA2015/000015 dated Apr. 27, 2015 (11 pages).

\* cited by examiner

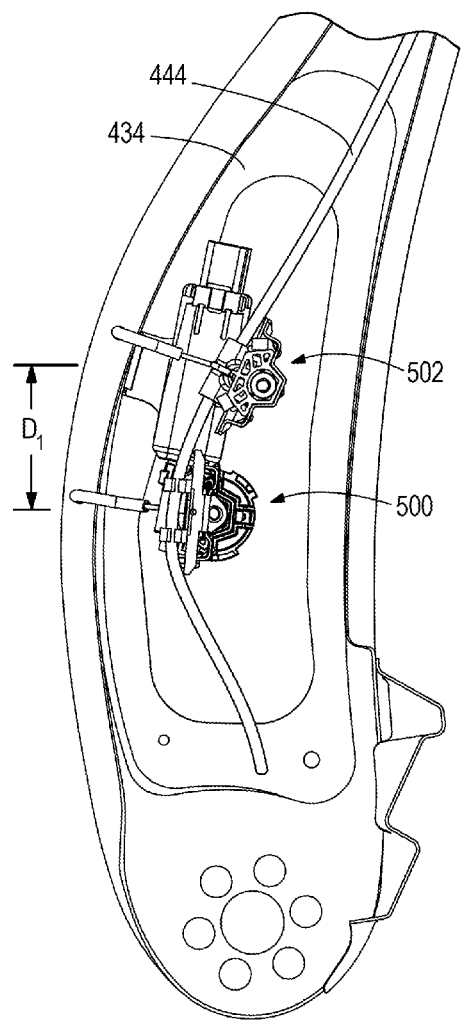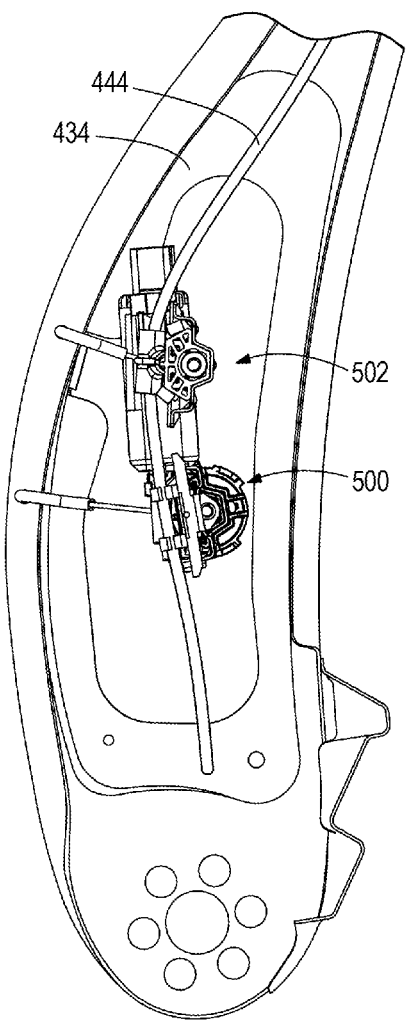
FIG. 11     FIG. 12

LUMBAR SUPPORT SYSTEM

BACKGROUND

The present invention relates to a lumbar support system for use within a seat, specifically for use within a vehicle seat.

Many lumbar support systems use an electromechanical actuator to move a load via a Bowden cable. The use of a Bowden cable, however, often results in poor total system efficiency, and such systems typically require numerous components, to include large, heavy motor(s) for actuation. In addition, these systems tend to be noisy during operation.

SUMMARY

In one embodiment of a lumbar support system for a seat backrest, the system includes a fixed frame and a lumbar support coupled to the fixed frame that is movable from a first position to a second position. A motor is coupled to the lumbar support. A threaded member is operatively engaged with the motor such that the motor rotates the threaded member about an axis. A first traveling member is engaged with the threaded member and a second traveling member is engaged with the threaded member. Rotation of the threaded member translates the first and second traveling members in opposite axial directions along the threaded member. A spacer is positioned between the first traveling member and the second traveling member. The spacer is configured to slide over the threaded member. A first flexible cable has a first end coupled to the first traveling member for movement therewith, a second end coupled to the fixed frame, and an intermediate portion operatively associated with the lumbar support. A second flexible cable has a first end coupled to the second traveling member for movement therewith, a second end coupled to the fixed frame, and an intermediate portion operatively associated with the lumbar support. The intermediate portion of the first flexible cable and the intermediate portion of the second flexible cable operate to move the lumbar support from the first position to the second position in response to translation of the first and second traveling members.

In an embodiment of a support system for a seat backrest, the system includes a fixed frame and a support. The support is in the form of a contour mat adapted to mount on the fixed frame. The contour mat includes a laterally positioned outer wire and a plurality of transverse wires. A first flexible cable is operatively coupled to the frame and has a first end, a second end, and a cable body. A second flexible cable is operatively coupled to the frame and has a first end, a second end, and a cable body. An actuator is configured to move the first flexible cable and the second flexible cable relative to the support. Upon actuation of the actuator, contact between the support and the cable body of at least one of the first flexible cable and the second flexible cable moves the support from a first position to a second position. The actuator is coupled only to the laterally positioned outer wire of the support.

In an embodiment of a lumbar support system for a seat backrest having a fixed frame, the system includes a lumbar support coupled to the fixed frame that is movable from a first position to a second position and a motor for moving the lumbar support. A threaded member is operatively associated with the motor such that the motor rotates the threaded member about an axis. A traveling member is operatively associated with the threaded member such that rotation of the threaded member translates the traveling member along the threaded member. The system further includes a flexible cable having a first end and a second end. The first end is coupled to the traveling member for movement therewith and the second end is coupled to the fixed frame such that translation of the traveling member in response to rotation of the threaded member moves the lumbar support element from the first position to the second position.

In an embodiment of an adjustable support system for a seat having a fixed frame, the adjustable support system includes a support movable from a first position to a second position relative to the frame. An actuator is coupled to only the support and configured to move the support between the first and second positions. A member is operatively associated with and movable by the actuator and has a length. A flexible cable has a first end and a second end. The first end is coupled to the member for travel along the length of the member and the second end is coupled to the fixed frame such that movement of the member by the actuator causes the flexible cable to move the support between the first position and the second position.

Other aspects of the invention will become apparent by consideration of the detailed description and accompanying drawings.

BRIEF DESCRIPTION OF THE DRAWINGS

FIG. 11 is a side view of the lumbar support system of FIG. 6 with one lumbar support mechanism extended and the other lumbar support mechanism retracted.

FIG. 12 is a side view of the lumbar support system of FIG. 6 with one lumbar support mechanism retracted and the other lumbar support mechanism extended.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
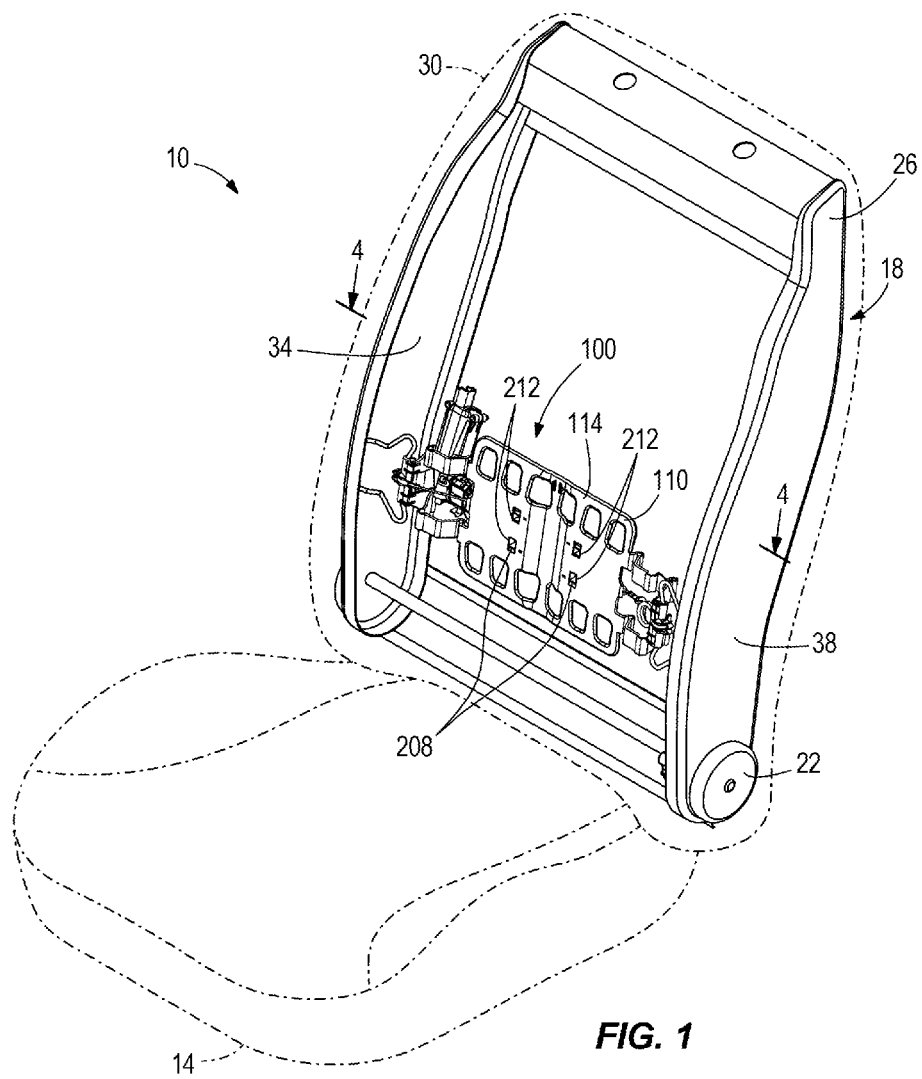
FIG. 1 is a perspective view of a vehicle seat including a lumbar support system.

FIG. 1 illustrates a seat 10, which for purposes of the following description may be any vehicle seat within the passenger compartment of a vehicle, though the seat 10 is not necessarily limited to vehicular applications. The seat 10 generally includes a seat bottom 14 (shown in phantom) and a seat backrest 18 for horizontal and vertical support, respectively, of a seat occupant. The seat backrest 18 is foldable relative to the seat frame at a pivot 22. A frame 26, which is covered by an overlying cushion 30 (shown in phantom), provides structural integrity for the backrest 18 and includes a pair of vertical support members 34, 38. A lumbar support system 100 extends between the vertical support members 34, 38 and is coupled thereto to permit adjustable lumbar support for the seated occupant.

As shown in FIG. 1, the lumbar support system 100 includes a lumbar support element, or basket 110, positioned medially between the vertical support members 34, 38. The basket 110 presents a generally flat front face 114 proximate the seat occupant functioning as a pressure surface against the occupant's lumbar region. Additional cushions, pads, or other materials not shown are situated over and within the seat backrest 18 and between the front face 114 and the seat occupant for added comfort.

Figure 2:
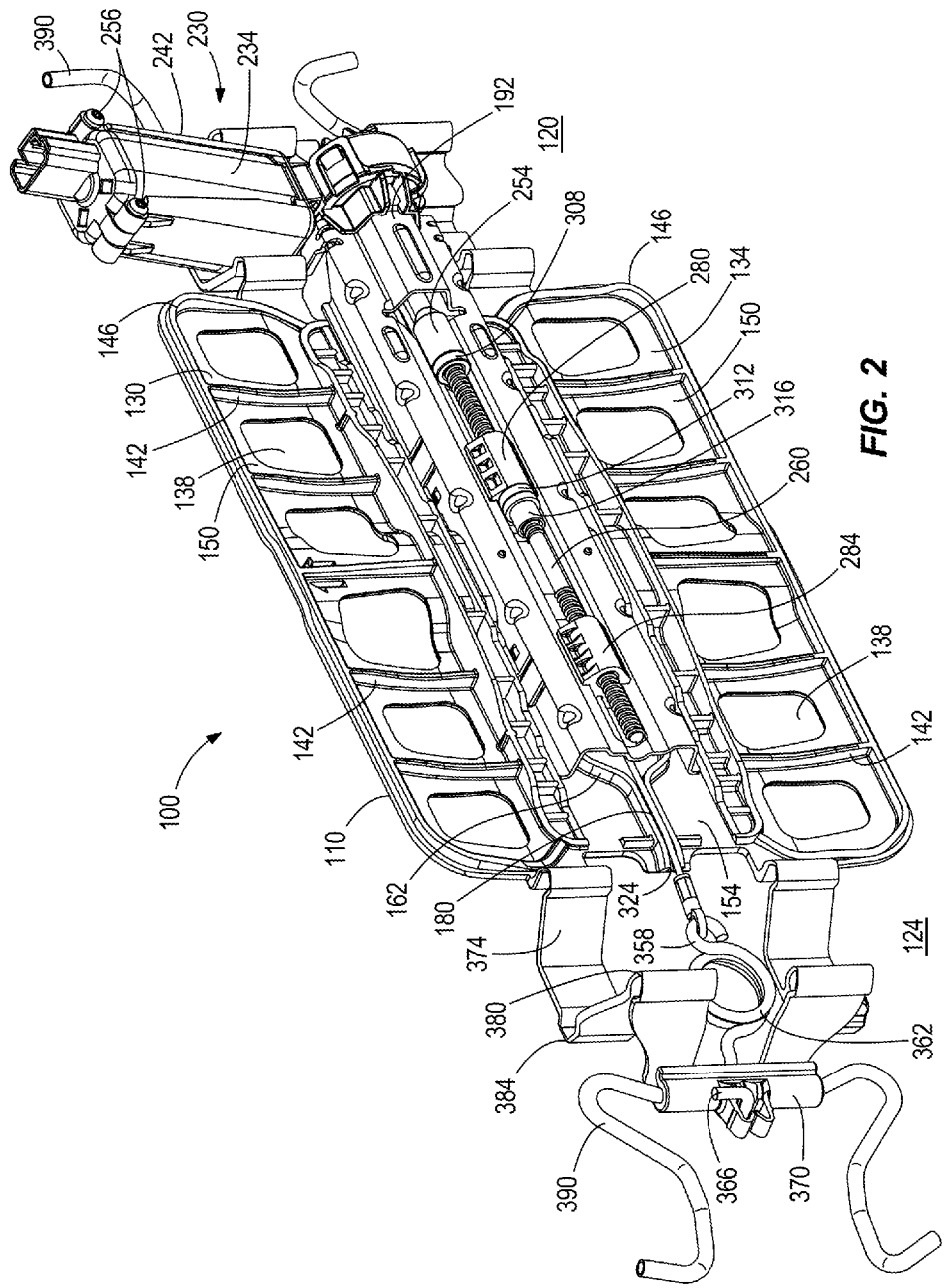
FIG. 2 is a perspective view of the lumbar support system of FIG. 1.
Figure 3:
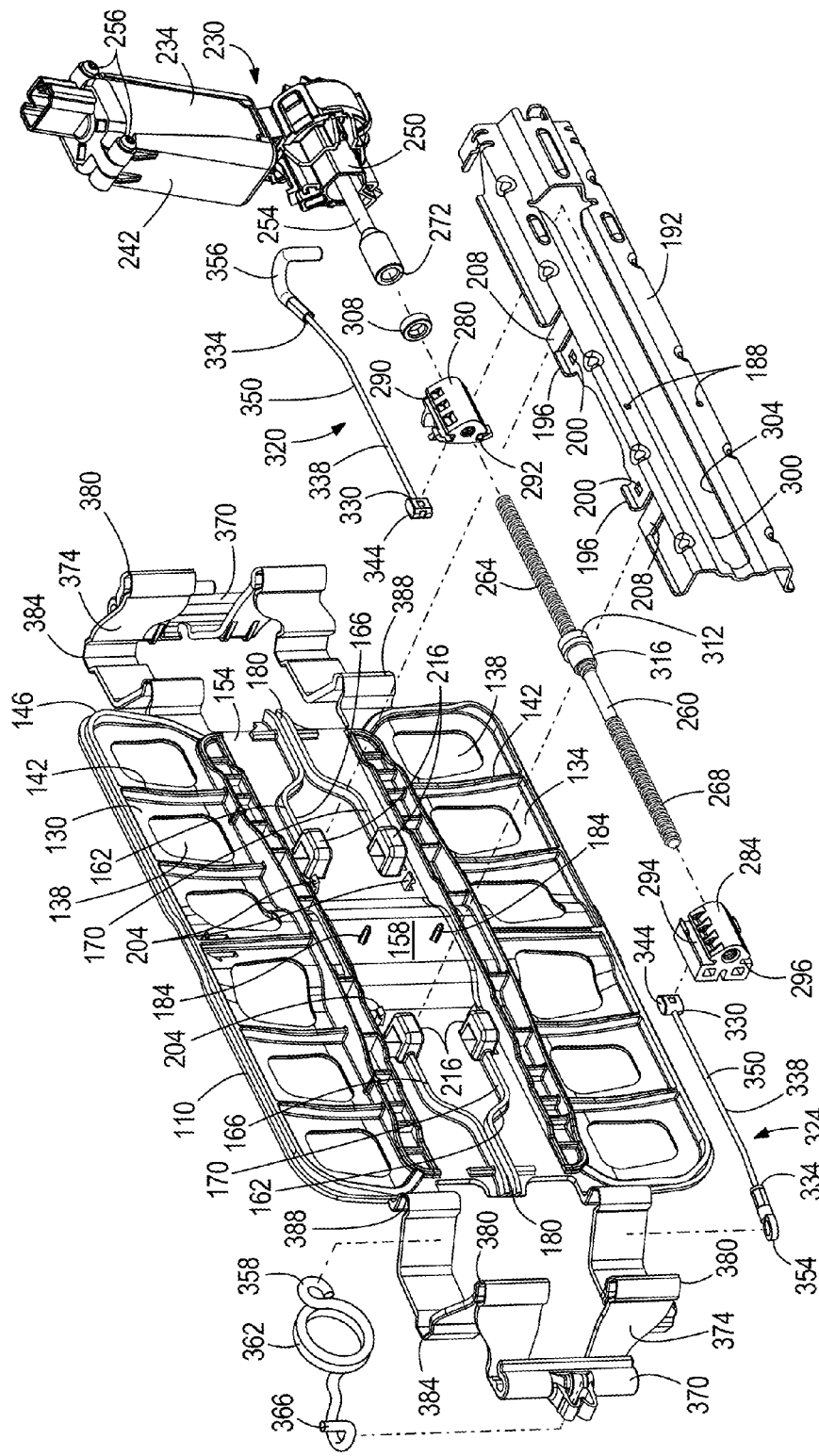
FIG. 3 is an exploded view of the lumbar support system of FIG. 1.

FIGS. 2 and 3 illustrate the lumbar support system 100 referenced with respect to a proximal end 120 (proximate to a drive assembly 230) and a distal end 124. The upper and lower portions 130, 134 of the basket 110 are formed to include a plurality of apertures 138 separated by stiffening ribs 142 generally interconnected by a border 146 on the rear face 150 of the basket 110. The central portion 154 of the basket 110 between the upper and lower portions 130, 134 includes a mounting face 158. The mounting face 158 supports two opposing sets of guides 162, each set comprising an upper and lower rail 166, 170 extending laterally along the central portion 154 and converging towards the proximal and distal ends 120, 124 of the basket 110, respectively, to form a cable channel 180, the purpose of which will be described below.

A pair of mounting pins 184 project rearward from the mounting face 158 for reception within mounting holes 188 of a rigid spindle rail 192. The spindle rail 192 includes a set of upper tabs 196 and lower tabs (not shown) each with a centrally located orifice 200. When positioned adjacent the mounting face 158, the tabs 196 engage opposing hooks 204, which, along with the mounting pins 184, align and secure the spindle rail 192 to the basket 110. Additional positioning and alignment is provided by the cooperation of projections 208 on either side of the upper and lower tabs 196 with slots 212 in the mounting face (see also FIG. 1). Structural integrity is maintained by contact between blocks 216 and the inside surface of the spindle rail 192.

Figure 3A:
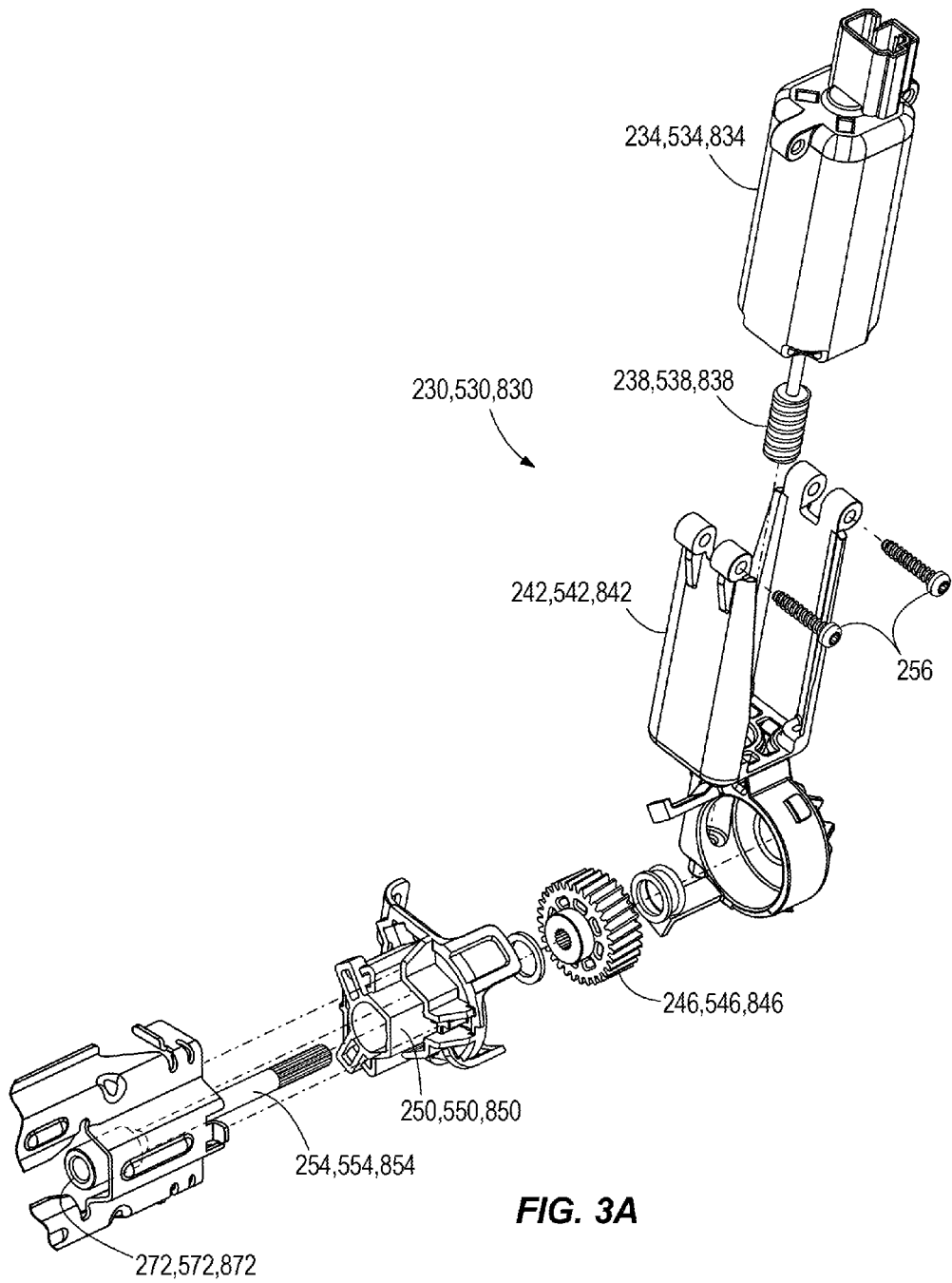
FIG. 3A is an exploded view of the drive assembly of the lumbar support system of FIG. 1.

Referring to FIGS. 2, 3, and 3A, a drive assembly, or actuator 230, includes a motor 234, a motor shaft with a pinion 238, a housing 242, a worm gear 246, a cap 250, and a drive shaft 254. The motor 234, secured to the housing 242 with fasteners 256, is preferably a D.C. reversible motor but can be any type of reversible motor suitable for the application and can further be varied in size and power as necessary. The worm gear 246, operatively engaged with the pinion 238 of the motor shaft, permits an orthogonal change of direction of the power applied to the drive shaft 254 and an increase in output torque from the motor 234. The gear 246 is contained within the housing 242, which also couples the motor 234 to the remaining drive assembly components. The splined drive shaft 254 mates with the worm gear 246 for co-rotation and transfer of power during operation. The cap 250, attached to the housing 242, provides additional protection for the worm gear 246 and drive shaft 254 and secures the motor 234 to the spindle rail 192.

Coupled to the drive shaft 254 and spanning a substantial portion of the spindle rail 192 is a threaded member, or spindle 260. The spindle 260 has proximal and distal threaded ends 264, 268. As illustrated, the proximal threads are right-hand threads and the distal threads are left-hand threads, though the handedness can be reversed in alternative embodiments. The proximal threaded end 264 is rotationally secured to and received within an opening 272 defined within the end of the drive shaft 254 such that the spindle 260 rotates with the drive shaft 254 upon actuation of the motor 234. Positioned about each threaded end 264, 268 of the spindle 260 is a traveling member, or slider, i.e., a proximal slider 280 and a distal slider 284. Each slider 280, 284 has an internally threaded body for engagement with the spindle 260 and opposing grooves 290, 292, 294, 296 that mate with opposing edges 300, 304 formed as part of the spindle rail 192. The oppositely threaded spindle ends 264, 268 together with the groove/edge interface of the sliders 280, 284 with the spindle rail 192 cause opposed translational motion of the sliders 280, 284 along the spindle 260 upon spindle rotation. A bumper 308 located adjacent the drive shaft 254 provides the limit of one end of travel for the proximal slider 280. A second bumper 312 adjacent a centrally positioned stop 316 establishes a second limit of travel and defines the range of movement for the proximal slider 280.

Proximal and distal flexible cables 320, 324 are coupled to the proximal slider 280 and the distal slider 284, respectively. Each cable 320, 324 includes a first end 330, a second end 334, and a cable body 338. The first end 330 has a connector 344 that fits within the body of the respective slider 280, 284 for movement therewith. The cable body 338 of each cable 320, 324 extends from the first end 330 and defines an intermediate section 350, a portion of which is substantially positioned within each respective channel 180. The intermediate section 350 terminates at the second end 334 coupled to a coil end fitting 354 (e.g., cable 324), or alternatively, to a hook fitting 356 (e.g., cable 320). The coil end fitting 354 is adapted to engage a first end 358 of a spring 362, such as a torsion spring. Though shown associated with the distal end 124, the spring 362 is operable with one or on both of the respective second ends 334 of the distal and proximal cables 320, 324. The spring 362 includes a second end 366 configured for attachment to the hook end 370 of a hinge 374 and permits a limited amount of flexion of the lumbar support system 100 both when an occupant is first seated and during operation to enhance occupant comfort. The hook fitting 356 of cable 320 wraps around a portion of the hook end 370 of the opposite hinge 374.

Figure 4:
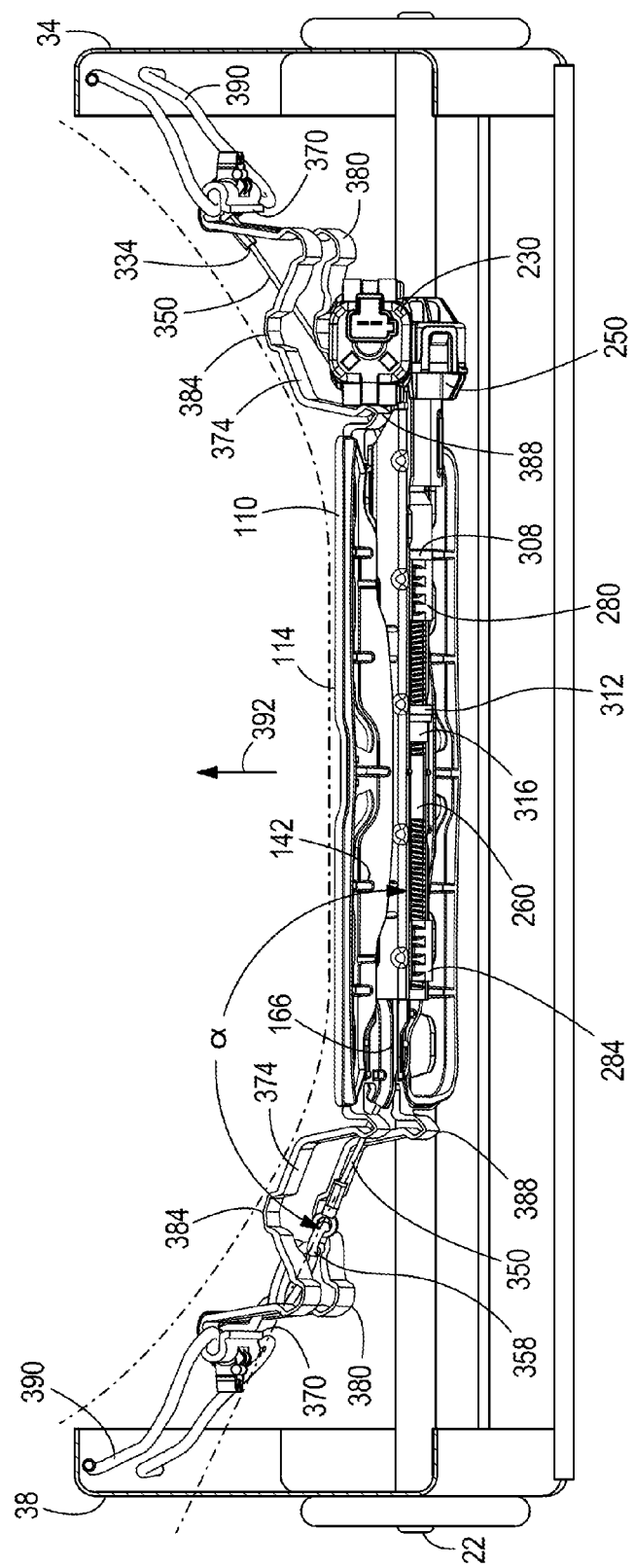
FIG. 4 is a section view from line 4-4 of FIG. 1 of the lumbar support system in a retracted position.
Figure 5:
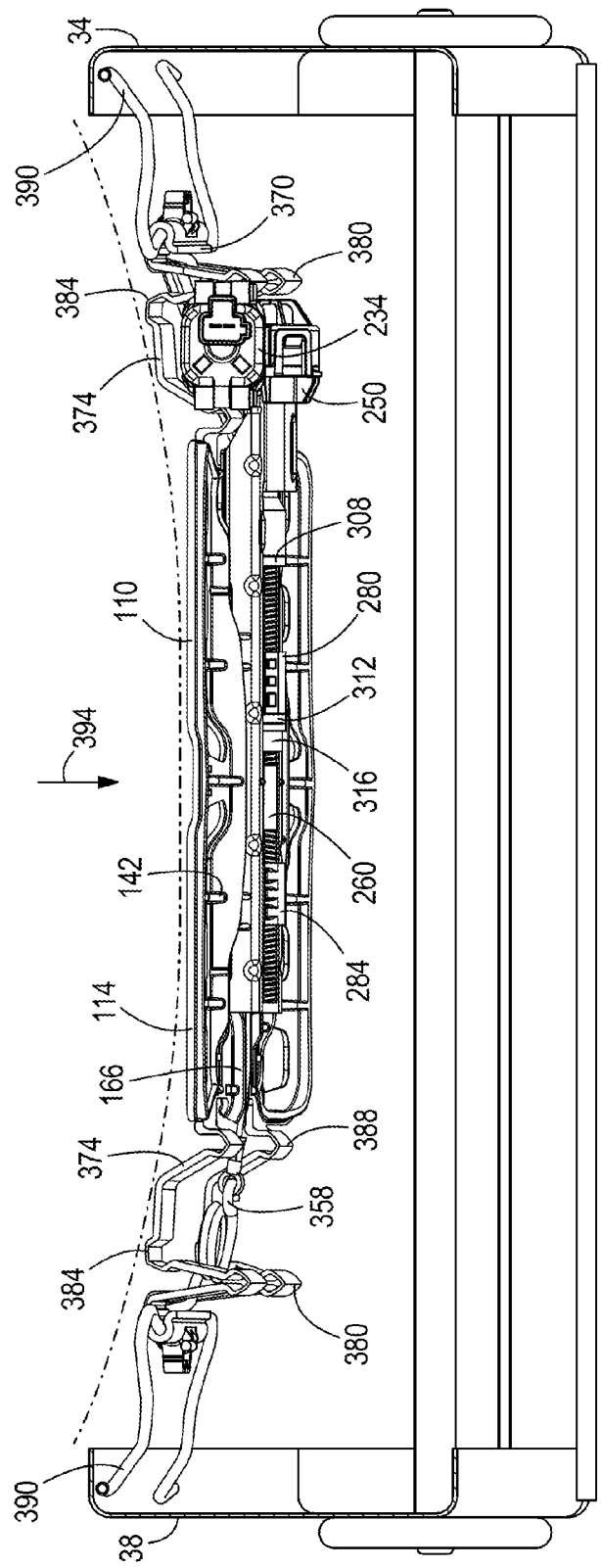
FIG. 5 is a section view from line 4-4 of FIG. 1 of the lumbar support system in an extended position.

The hinge 374 is formed as a "living" hinge that adjoins the basket 110 at both the upper and lower portions 130, 134 opposite the hook end 370. As illustrated, the hinge 374 includes first, second, and third pivots points 380, 384, 388, although fewer or more than three pivots points are also within the present scope. As shown in FIGS. 2, 4, and 5, the pivot points 380, 384, 388 are positioned to preclude interference with the motor 234 during the course of travel of the basket 110. The hinge 374 and the basket 110 are preferably formed as a unitary piece. Alternatively, the hinge 374 can be a separate piece secured to the basket 110 in a manner known to those of skill in the art. The hook end 370 of the hinge 374 is formed to fit over a coupling element in the form of an attachment wire 390 fixed to a respective vertical support member 34, 38 of the frame 26 (see FIG. 1).

In operation, a seat occupant activates the power actuator 230 using an electrically actuated switch located preferably adjacent the seat backrest 18 or the seat bottom 14. Referring to FIGS. 4 and 5, the lumbar support system can be in any position between a fully retracted position (FIG. 4) and a fully extended position (FIG. 5) when the actuator 230 is initiated. Upon energizing the motor 234, engagement of the worm gear 246 rotates the drive shaft 254, concurrently turning the spindle 260. If the lumbar support system 100 is activated to retract the basket 110, the spindle 260 rotates in a first direction. If the lumbar support system 100 is activated to extend the basket 110, the spindle 260 rotates in a second, opposite direction. Activation in either direction is user selectable with the electrically actuated switch. Due to the interaction of the grooves 290, 292, 294, 296 of the sliders 280, 284 with the edges 300, 304 of the spindle rail 192, rotation of the spindle 260 translates the sliders 280, 284, one of which travels in the proximate direction (120) and the other of which travels in the distal direction (124).

If the occupant desires extension of the basket 110 to provide more lumbar support, clockwise rotation of the spindle 260 (viewed from the distal direction 124) causes the proximal slider 280 to travel distally and the distal slider 284 to travel proximally along the spindle 260, i.e., the sliders 280, 284 and their respective attached cables 320, 324 approach each other. As the sliders 280, 284 converge, portions of the intermediate sections 350 of each cable slide within their respective channels 180, contacting the basket 110. This contact results in a force against the basket 110 directing the basket frontward, as shown in FIG. 4 by arrow 392. When the proximal slider 280 contacts the bumper 312, the motor 234 stops, which ceases rotation of the spindle 260. Other methods of de-energizing the motor 234 at a certain point of travel, commonly known to those of skill in the art, are also possible for use with the lumbar support system 100.

The hinges 374, which are anchored to the attachment wire 390 at the hook end 370, facilitate movement of the basket 110 by flexing to provide a smooth motion throughout the range of travel. As shown in FIG. 5, the pivot points 380, 384, 388 permit the collapse of the hinge 374 around the motor 234 at full extension. The attachment wires 390, each secured to a respective vertical support 30, 34 of the frame 26, rotate as necessary with the movement of the lumbar support system 100.

If the occupant desires retraction of the basket 110 to lessen the amount of lumbar support, counterclockwise rotation of the spindle 260 causes the proximal slider 280 to travel proximally and the distal slider 284 to travel distally along the spindle 260, i.e., the sliders 280, 284 and their respective attached cables 320, 324 separate. As the sliders 280, 284 move farther apart, pressure against the basket 110 from the intermediate sections 350 of the cables lessens and the basket 110 retracts to the rear in response, as shown in FIG. 5 by arrow 394. When the slider 280 contacts the bumper 308, the motor 234 stops as previously described.

During the course of travel of the basket 110, the cables 320, 324 remain disposed in substantially the same plane from refraction to extension and back, and the angle α (see FIG. 4) between the first end 330 and the second end 334 of each cable 320, 324 remains obtuse.

Figure 6:
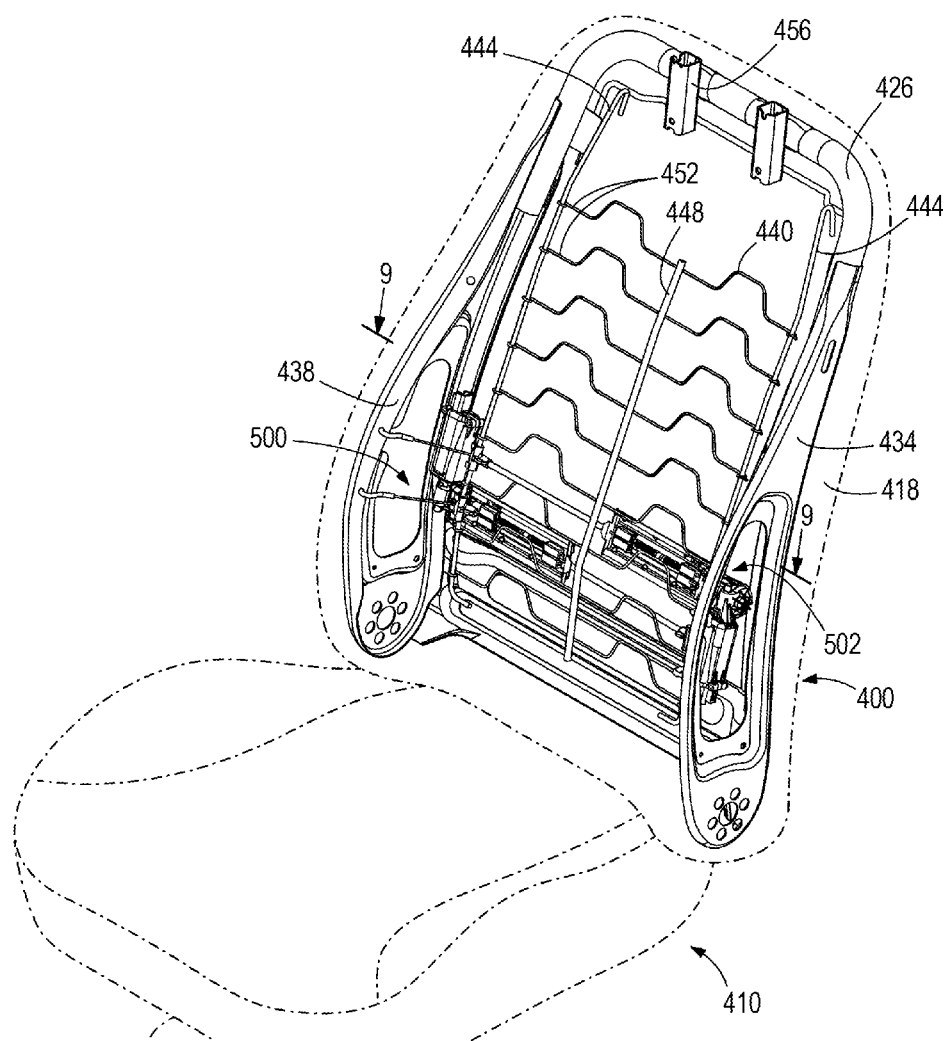
FIG. 6 is a perspective view of a vehicle seat including another lumbar support system.

FIG. 6 illustrates an alternative version of a lumbar support system 400 for a seat 410, the general features of which have been previously described. The seat 410 includes a seat bottom 414 (shown in phantom), a foldable seat backrest 418, and a frame 426 with vertical support members 434, 438. A lumbar support element in the form of a contour mat or flexmat 440 includes lateral outer wires 444, a central wire 448, and a plurality of transverse wires 452 extending between the lateral outer wires 444. The frame 426 can further includes a pair of receptacles 456 for receiving the supports of a headrest (not shown). As illustrated, the lumbar support system 400 includes a pair of independently adjustable lumbar support mechanisms 500, 502.

Figure 7:
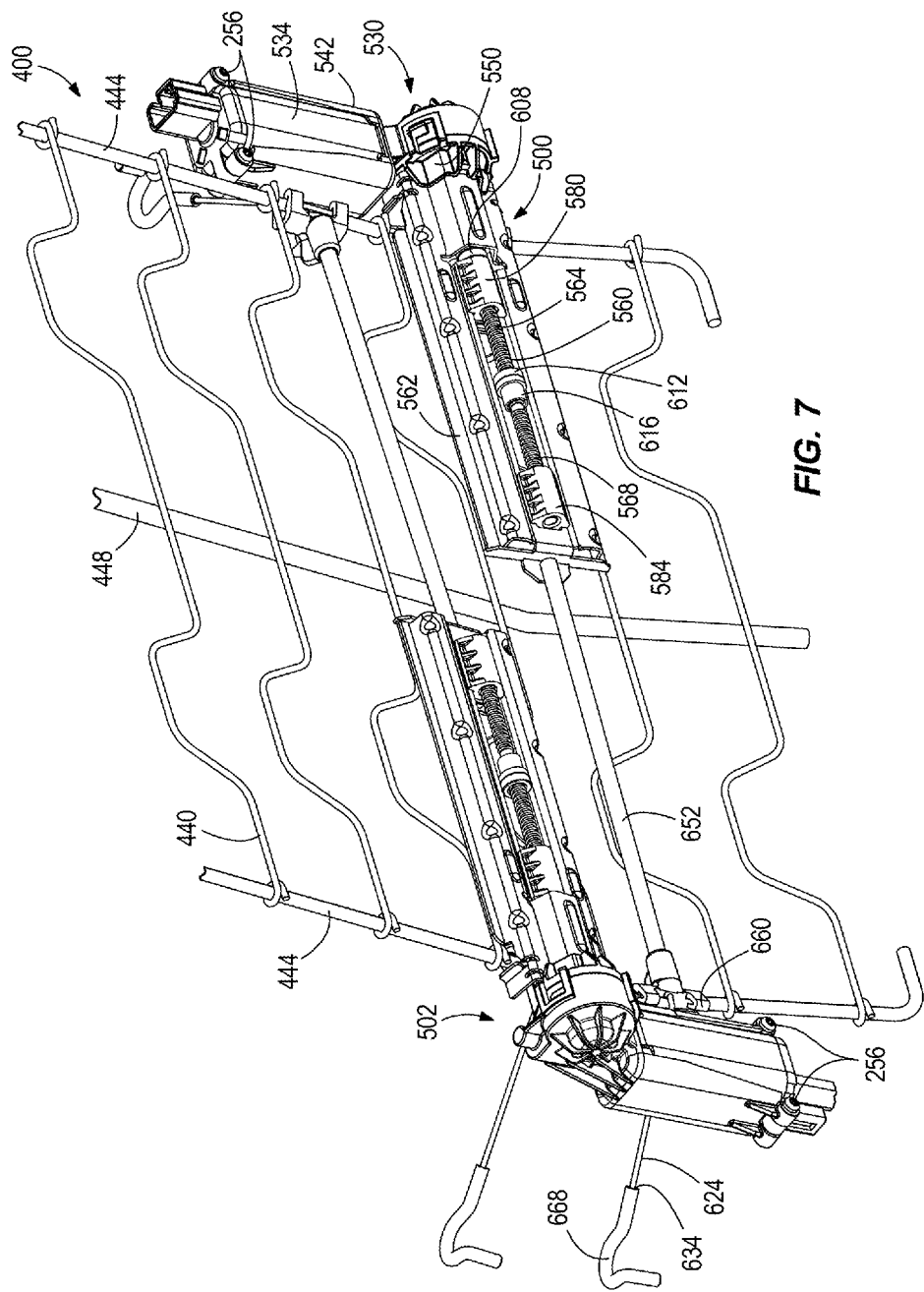
FIG. 7 is a perspective view of the lumbar support system of FIG. 6.
Figure 8:
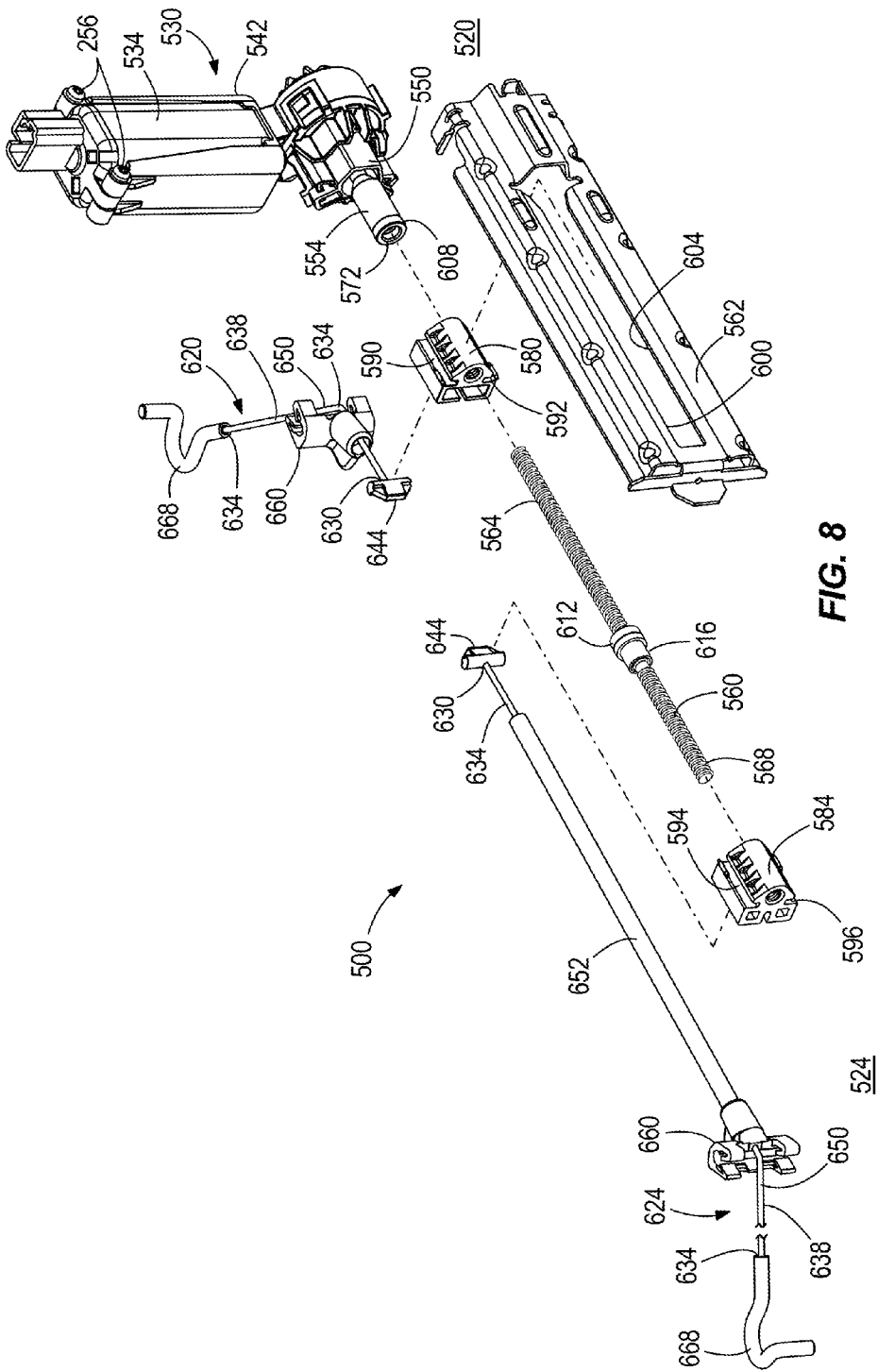
FIG. 8 is an exploded view of a lumbar support mechanism of the lumbar support system of FIG. 6.

FIG. 7 illustrates the lumbar support system 400, with FIG. 8 detailing the components of a proximal adjustable lumbar support mechanism 500 referenced with respect to a proximal end 520 and a distal end 524.

A drive assembly, or actuator 530, is substantially as shown in FIG. 3A and includes a motor 534, a motor shaft with a pinion 538, a housing 542, a worm gear 546, a cap 550, and a drive shaft 554 that interact as previously described with respect to the system of FIG. 1. A threaded member, or spindle 560, is coupled to the drive shaft 554 and spans a substantial portion of a spindle rail 562. The spindle 560 has right-hand proximal threads and left-hand distal threads. The proximal threaded end 564 is rotationally secured to and received within an opening 572 defined by the end of the drive shaft 554 and rotates with the drive shaft 554 upon actuation of the motor 534. Positioned about each threaded end 564, 568 of the spindle 560 is a slider, i.e., a proximal slider 580 and a distal slider 584, respectively, each with an internally threaded body for engagement with the spindle 560. Opposing grooves 590, 592, 594, 596 mate with opposing edges 600, 604 formed as part of the spindle rail 562 to cause opposite translational motion of the sliders 580, 584 during operation. A bumper 608 located adjacent the drive shaft 554 provides a first travel limit for the proximal slider 580, and a second bumper 612 adjacent a centrally positioned stop 616 provides a second travel limit, the limits defining the range of movement for the proximal slider 580.

Proximal and distal cables 620, 624 are coupled to the proximal slider 580 and the distal slider 584, respectively. Each cable 620, 624 includes a first end 630, a second end 634, and a cable body 638. The first end 630 of each cable 620, 624 includes a connector 644 that couples to the body of a respective slider 580, 584 for movement therewith. The cable body of each cable 620, 624 extends from the first end 630 and defines an intermediate section 650. The intermediate section 650 of the distal cable 624 of the proximal lumbar support mechanism 500, as illustrated in FIG. 8, is longer than the intermediate section 650 of the proximal cable 620 of the same lumbar support mechanism. This longer intermediate section 650 of the cable 624 is situated within a rigid sleeve 652 having an inside diameter larger than the diameter of the cable 624 to permit free movement of the cable 624 within. Portions of the intermediate sections 650 of the proximal and distal cables 620, 624 each pass through and are contained by a clip 660 coupling the proximal and distal cables 620, 624, and thereby the lumbar support mechanism 500, to the flexmat 440 through the outer wires 444. Each intermediate section 650 terminates at the second end 634, which is coupled to a hook fitting 668, itself secured to a respective vertical support member 434, 438 of the frame 426. Referring to FIG. 7, the distal lumbar support mechanism 502 is a mirror image of the proximal lumbar support mechanism 500.

The seat occupant can optionally select to activate the proximal lumbar support mechanism 500 or the distal lumbar support mechanism 502 in the same manner. Alternatively, the seat occupant may be able to activate both proximal and distal mechanisms 500, 502 with the same switch. The following operational description will focus on the support mechanism 500 but is equally applicable to the support mechanism 502.

Figure 9:
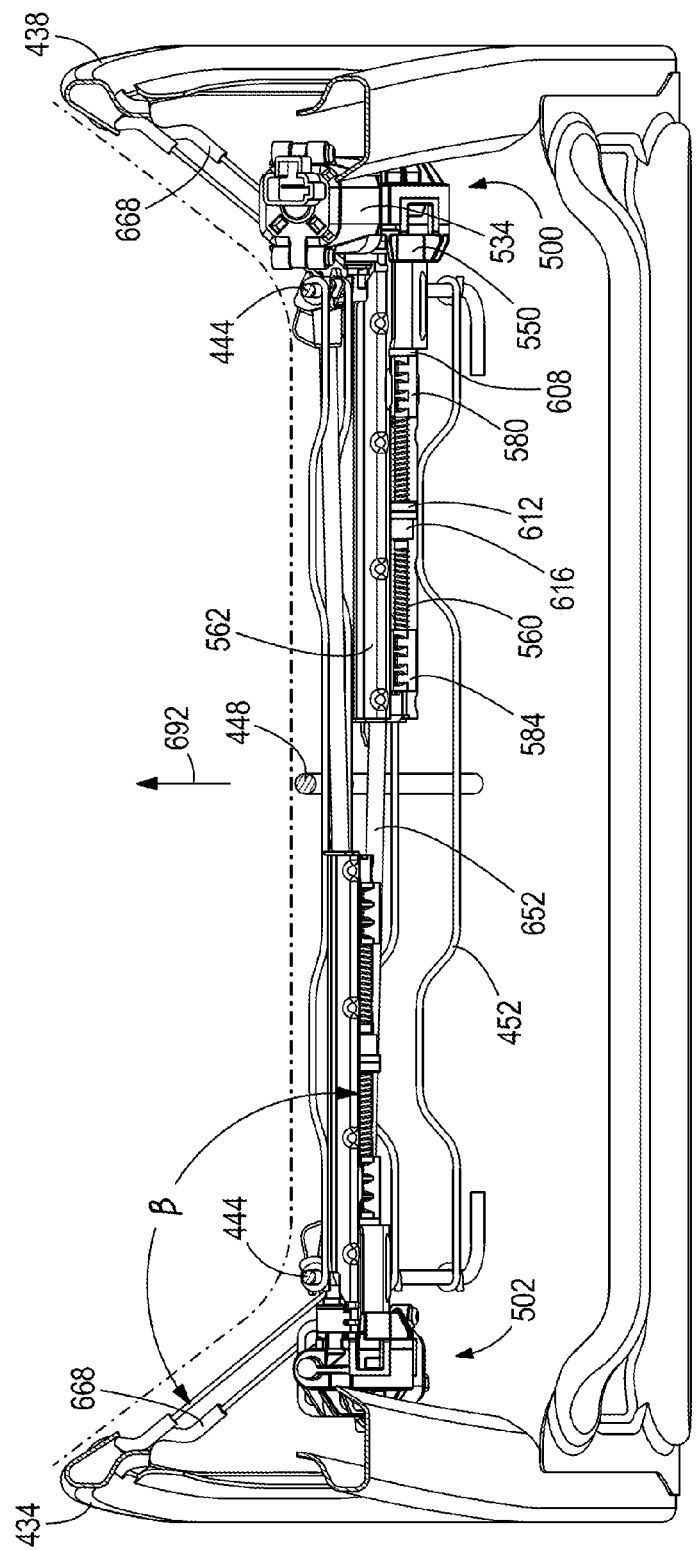
FIG. 9 is a section view from line 9-9 of FIG. 6 of the lumbar support system in a retracted position.
Figure 10:
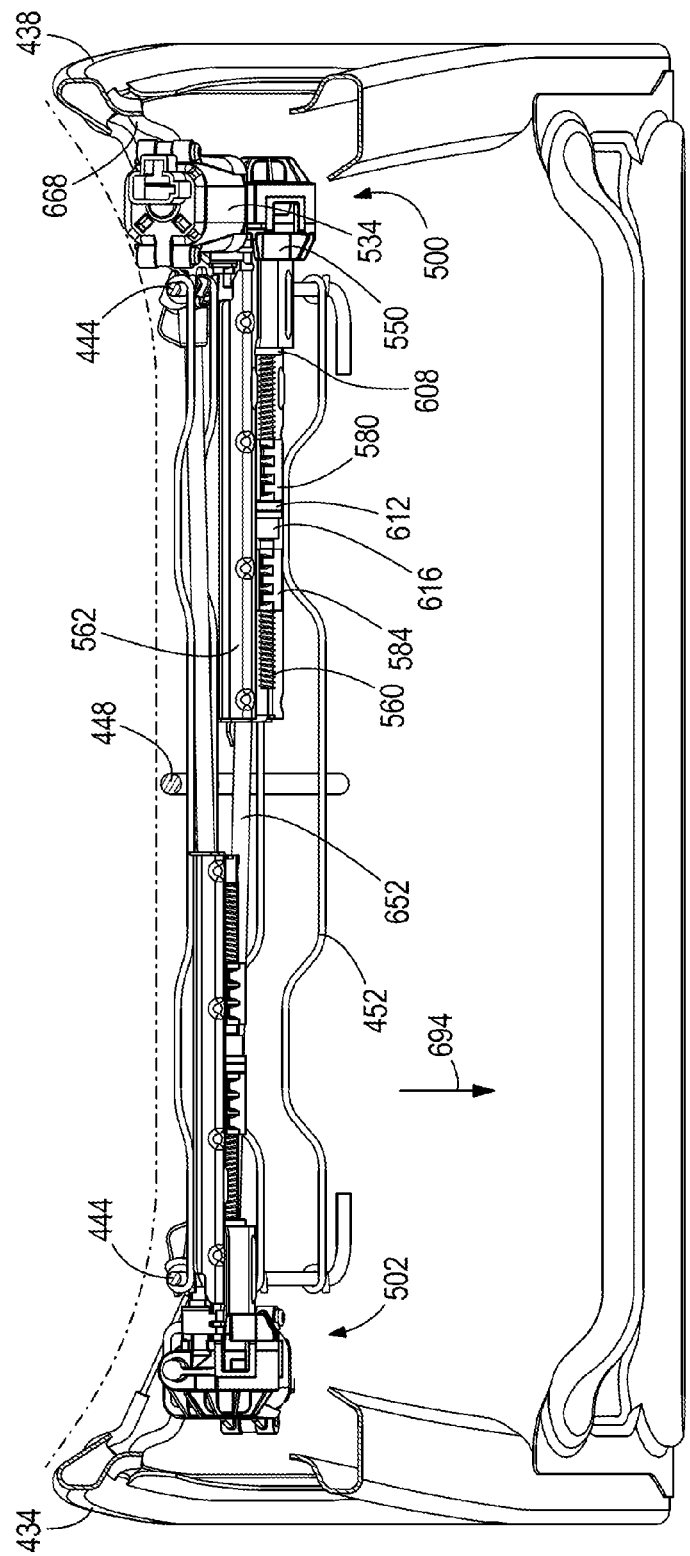
FIG. 10 is a section view from line 9-9 of FIG. 6 of the lumbar support system in an extended position.

A seat occupant activates the actuator 530 for the proximal lumbar support mechanism 500 using an electrically actuated switch located preferably adjacent the seat backrest 418 or the seat bottom 414. Referring to FIGS. 9 and 10, the mechanism 500 can be in any position between a fully retracted position (FIG. 9) and a fully extended position (FIG. 10) when the actuator 530 is initiated. Upon energizing the motor 534, engagement of the worm gear 546 rotates the drive shaft 554, concurrently turning the spindle 560. If the lumbar support mechanism 500 is activated to retract, i.e., provide less support, the spindle 560 rotates in a first direction. If the lumbar support mechanism 500 is activated to extend, i.e., provide more support, the spindle 560 rotates in the opposite direction. Activation in either direction is user selectable with the electrically actuated switch. As with the embodiment of FIG. 1, rotation of the spindle 560 translates the sliders 580, 584, the grooves 590, 592, 594, 596 of which interact with the edges 600, 604 of the spindle rail 562 such that one slider 580, 584 travels in the proximate direction (520) and the other slider 580, 584 travels in the distal direction (524).

To extend the lumbar support mechanism 500, the seat occupant activates the mechanism for clockwise rotation of the spindle 560 (viewed from the distal direction 524), which causes the proximal slider 580 to travel distally and the distal slider 584 to travel proximally along the spindle 560, i.e., the sliders 580, 584 and their respective attached cables 620, 624 approach each other. As the sliders 580, 584 converge, the intermediate sections 650 contact the lateral outer wires 444, forcing the region of the flexmat 440 spanned by the mechanism 500 frontward, as shown in FIG. 9 by arrow 692. When the proximal slider 580 contacts the bumper 612, the motor 534 stops, which ceases rotation of the spindle 560. As shown in FIGS. 9 and 10, the hook ends 668 allow for coupled rotation about the vertical support members 434, 438 to permit smooth movement of the lumbar support mechanism 500 as it travels forward. Although not shown, springs coupled with one or both of the cables 620, 624 in series can permit a limited amount of flexion and provide "give" to an occupant to enhance the comfort of the device.

To retract the lumbar support mechanism 500 to lessen the amount of lumbar support, the seat occupant activates the mechanism 500 for counterclockwise rotation of the spindle 560, which causes the proximal slider 580 to travel proximally and the distal slider 584 to travel distally, i.e., the sliders 580, 584 and their respective attached cables 620, 624 separate. As the sliders 580, 584 grow farther apart, pressure against the lateral outside wires 444 from the intermediate sections 650 of the cables 620, 624 lessens and the flexmat 440 retracts rearward in response, as shown in FIG. 10 by arrow 694. When the proximal slider 580 contacts the bumper 608, the motor 534 stops, as previously described.

The lumbar support mechanisms 500, 502 are independently operational, and both can be operated through the full extent of their range. For example, both lumbar support mechanisms 500, 502 can be extended, both retracted, or one can be fully or partially retracted while the other is fully or partially extended. Referring to FIG. 11, the proximal lumbar support mechanism 500 is in the fully extended position while the distal lumbar support mechanism 502 is in the fully retracted position (the motor of mechanism 502 is absent for viewing). As shown in FIG. 12, the proximal lumbar support mechanism 500 is in the fully refracted position while the distal lumbar support mechanism 502 is in the fully extended position. Any degree of independent extension/retraction of the mechanisms 500, 502 is possible between the range illustrated in FIGS. 11 and 12. The vertical distance $D_1$ separating the mechanisms 500, 502 is approximately 50 mm, but can be of a greater or lesser magnitude for a particular application.

As with the lumbar support system 100, during the course of travel of the contour mat 440, the cables 620, 624 remain disposed in substantially the same plane from retraction to extension and back, and the angle β (see, e.g., FIG. 9) between the first end 630 and the second end 634 of each cable 620, 624 remains obtuse.

Figure 13:
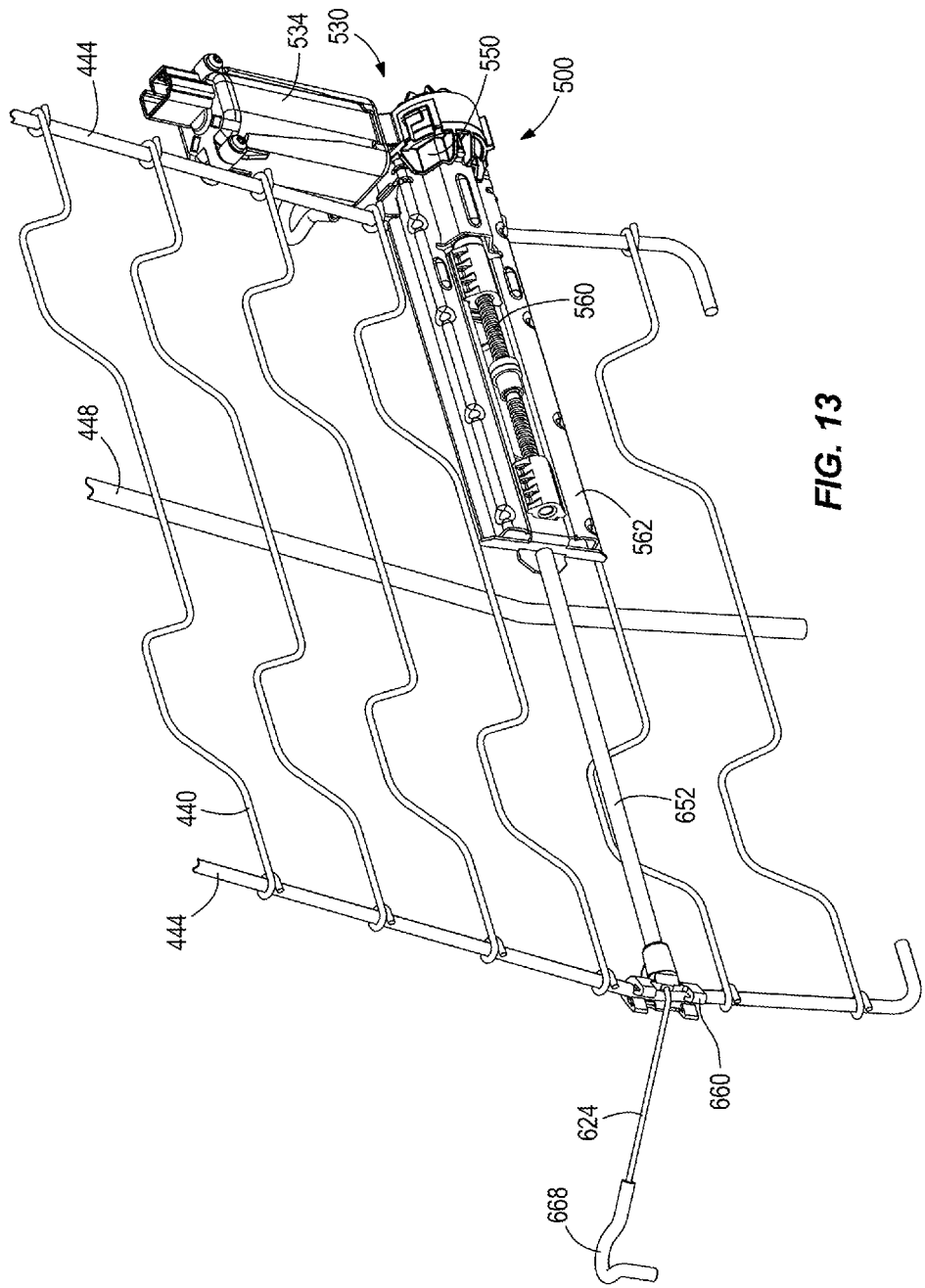
FIG. 13 is a perspective view of another lumbar support system with a single lumbar support mechanism.

In some applications, a single lumbar support mechanism, e.g., mechanism 500, can be used alone, as shown in FIG. 13, with operation of the mechanism substantially as previously described.

Figure 14:
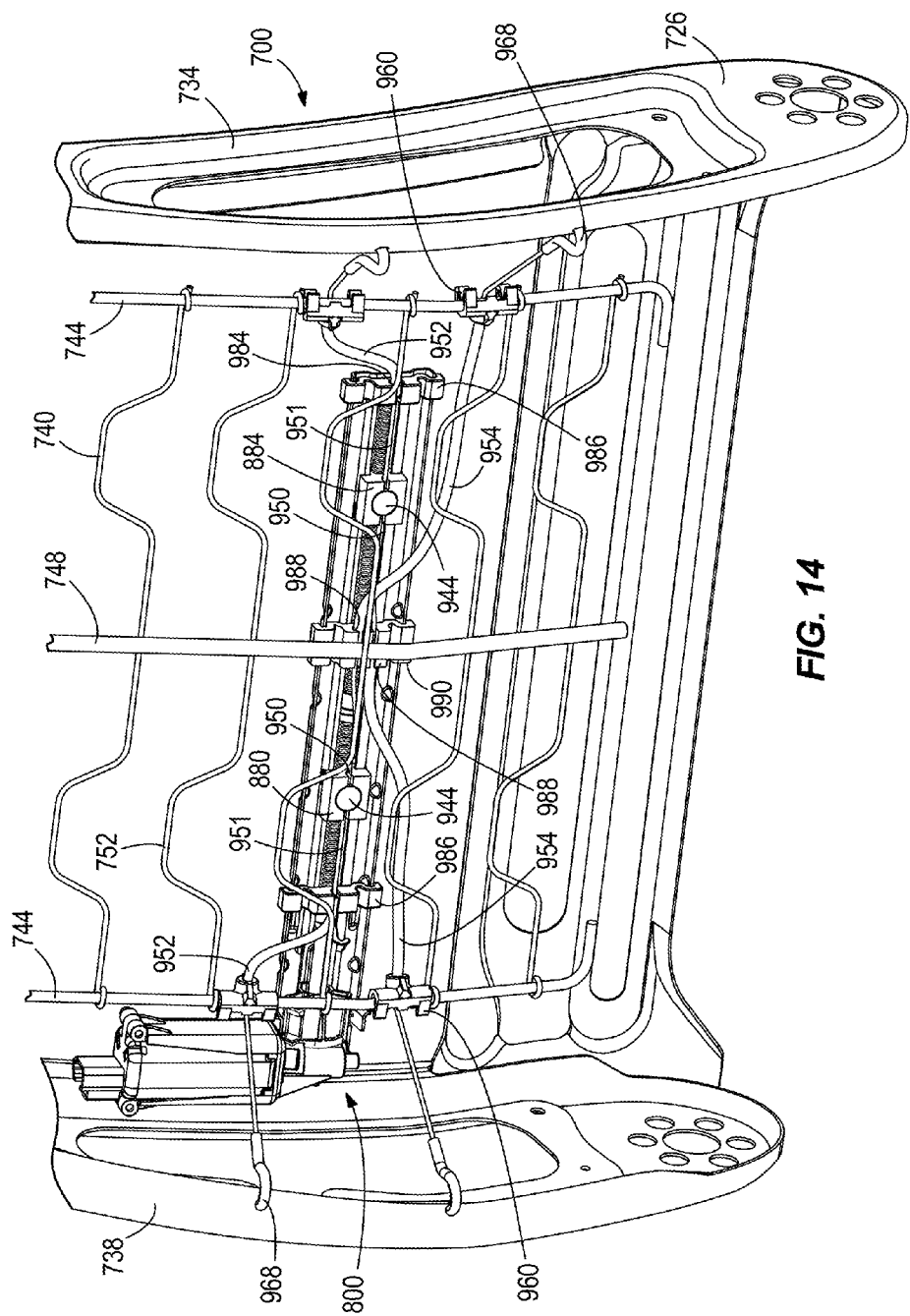
FIG. 14 is a partial perspective view of a vehicle seat including another lumbar support system.

FIG. 14 illustrates an alternative version of a lumbar support system 700 for a seat, the general features of which have been previously described. The seat includes a frame 726 with vertical support members 734, 738. A lumbar support element in the form of a contour mat or flexmat 740 includes lateral outer wires 744, a central wire 748, and a plurality of transverse wires 752 extending between the lateral outer wires 744. The lumbar support system 700 includes an independently adjustable lumbar support mechanism 800.

Figure 15:
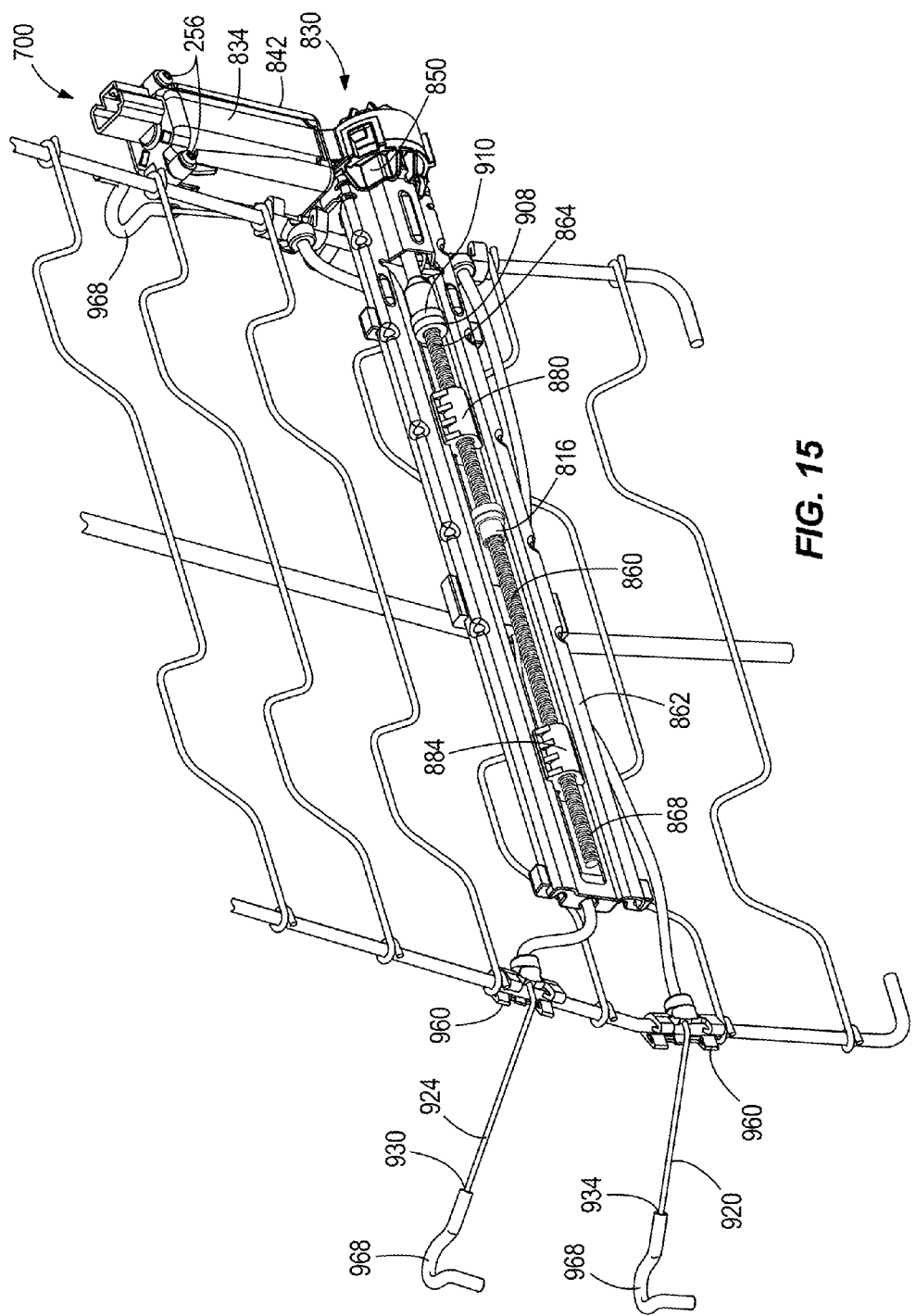
FIG. 15 is a perspective view of the lumbar support system of FIG. 14.
Figure 16:
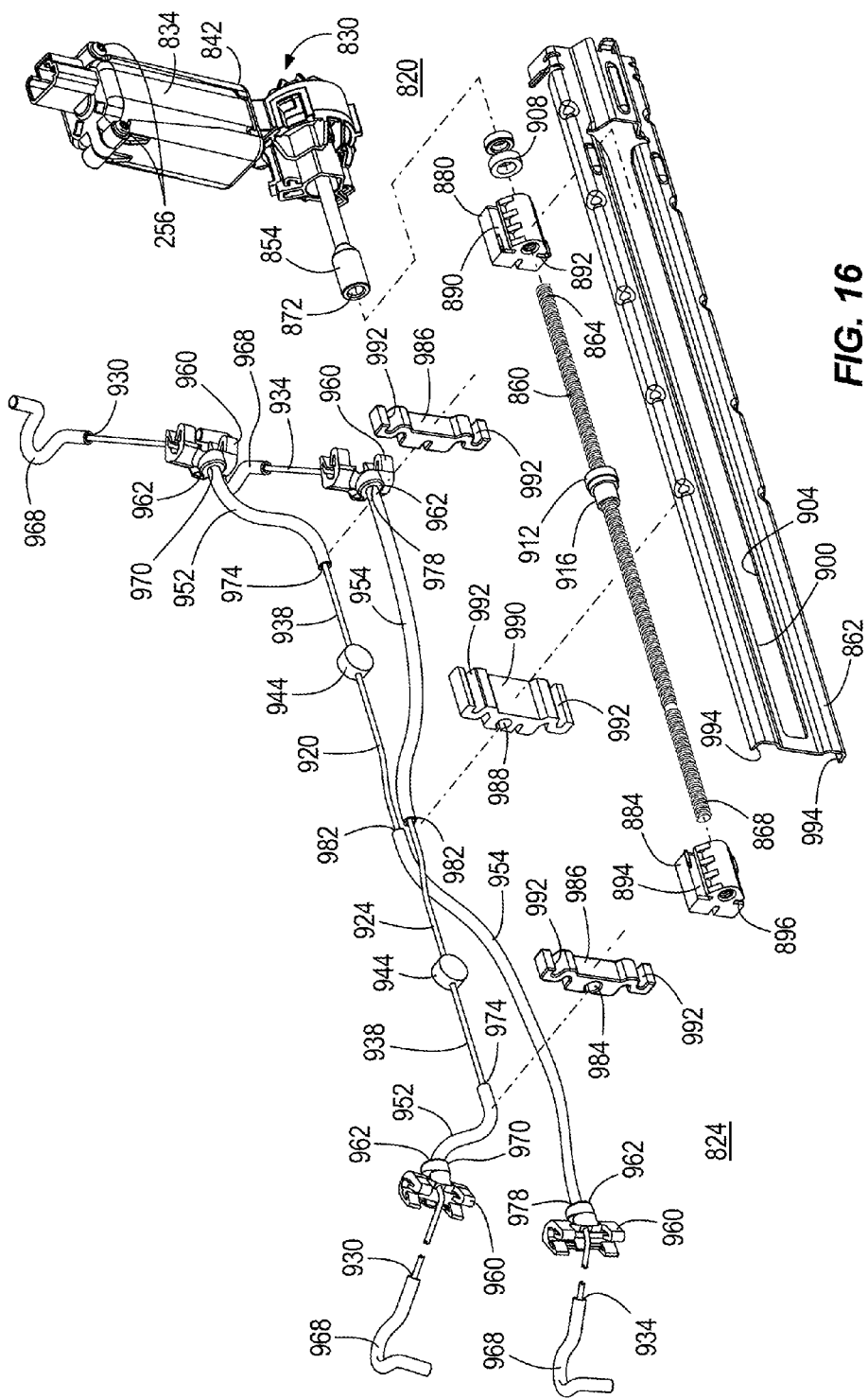
FIG. 16 is an exploded view of a lumbar support mechanism of the lumbar support system of FIG. 14.

FIG. 15 illustrates the lumbar support system 700, with FIG. 16 detailing the components of the adjustable lumbar support mechanism 800 referenced with respect to a proximal end 820 and a distal end 824.

A drive assembly, or actuator 830, is substantially as shown in FIG. 3A and includes a motor 834, a motor shaft with a pinion 838, a housing 842, a worm gear 846, a cap 850, and a drive shaft 854 that interact as previously described with respect to the system of FIG. 1. A threaded member, or spindle 860, is coupled to the drive shaft 854 and spans a substantial portion of a spindle rail 862. The spindle 860 has right-hand proximal threads and left-hand distal threads. The proximal threaded end 864 is rotationally secured to and received within an opening 872 defined by the end of the drive shaft 854 and rotates with the drive shaft 854 upon actuation of the motor 834. Positioned about each threaded end 864, 868 of the spindle 860 is a slider, i.e., a proximal slider 880 and a distal slider 884, respectively, each with an internally threaded body for engagement with the spindle 860. Opposing grooves 890, 892, 894, 896 mate with opposing edges 900, 904 formed as part of the spindle rail 862 to cause opposite translational motion of the sliders 880, 884 during operation. Bumper 908 located adjacent the drive shaft 854 provide a first travel limit for the proximal slider 880, and a bumper 912 adjacent a centrally positioned stop 916 provides a second travel limit, the limits defining the range of movement for the proximal slider 880.

A first cable 920 is coupled to the proximal slider 880 and a second cable 924 is coupled to the distal slider 884. Each cable 920, 924 includes a first terminus 930, a second terminus 934, and a cable body 938. A connector 944 securely couples the body of a respective slider 880, 884 to each respective cable body 938 such that no relative motion exists between the connector 944 and its attached cable 938 (see also FIG. 14). The cable body 938 of each cable 920, 924 extends from the first terminus 930 to the second terminus 934 and is partitioned into a first intermediate section 950 ending on one side of a respective connector 944 and a second intermediate section 951 ending on the other side of the respective connector 944 (see FIG. 14). Portions of each cable body 938 are operationally situated within first and second sleeves 952, 954 having an inside diameter larger than the diameter of the cable bodies 938 to permit free movement of each cable within. Portions of the cable bodies 938 of each cable 920, 924 near each terminus 930, 934 pass through and are contained by a clip 960 coupling the first and second cables 920, 924, and thereby the lumbar support mechanism 800, to the flexmat 740 through the outer wires 744. As illustrated, the couplings 962 of the clips 960 are positioned such that the wire enters the clip 960 in a direction substantially parallel to the spindle 860, although the couplings 962 of one or more of the clips 960 can alternatively be angled toward the spindle 860 to permit a more direct path for the cables 920, 924. The first and second termini 930, 934 are each coupled to a hook fitting 968, itself secured to a respective vertical support member 734, 738 of the frame 726.

Referring to FIGS. 14 and 16, each of sleeves 952 includes an outer end 970 and an inner end 974. Each of sleeves 954 includes an outer end 978 and an inner end 982. The outer ends 970, 978 of each sleeve connect to each respective clip 960. The inner ends 974 of the sleeves 952 each fit and are secured within a recess 984 of a lateral fitting 986. The inner ends 982 of the sleeves 954 each fit and are secured within a recess 988 of a central fitting 990. Each fitting 986, 990 includes upper and lower channels 992 that fit over the top and bottom rims 994 of the rail 862.

A seat occupant activates the actuator 830 for the lumbar support mechanism 800 using an electrically actuated switch located preferably adjacent the seat backrest or the seat bottom. Referring to FIGS. 17-21, the mechanism 800 can be disposed in a first position to provide more support in an upper lumbar region than a lower lumbar region (FIGS. 18-19) or disposed in a second position to provide more support in a lower lumbar region than an upper lumbar region (FIGS. 20-21) when the actuator 830 is initiated.

Upon energizing the motor 834, engagement of the worm gear 846 rotates the drive shaft 854 (see FIG. 3A), concurrently turning the spindle 860. If the lumbar support mechanism 800 is activated to the first position, the spindle 860 rotates in a first direction. If the lumbar support mechanism 800 is activated to the second position, the spindle 860 rotates in the opposite direction. Activation in either direction is user selectable with the electrically actuated switch. As with the previous embodiments, rotation of the spindle 860 translates the sliders 880, 884, the grooves 890, 892, 894, 896 of which interact with the edges 900, 904 of the spindle rail 862 such that one slider 880, 884 travels in the proximate direction (820) and the other slider 880, 884 travels in the distal direction (824).

Figure 17:
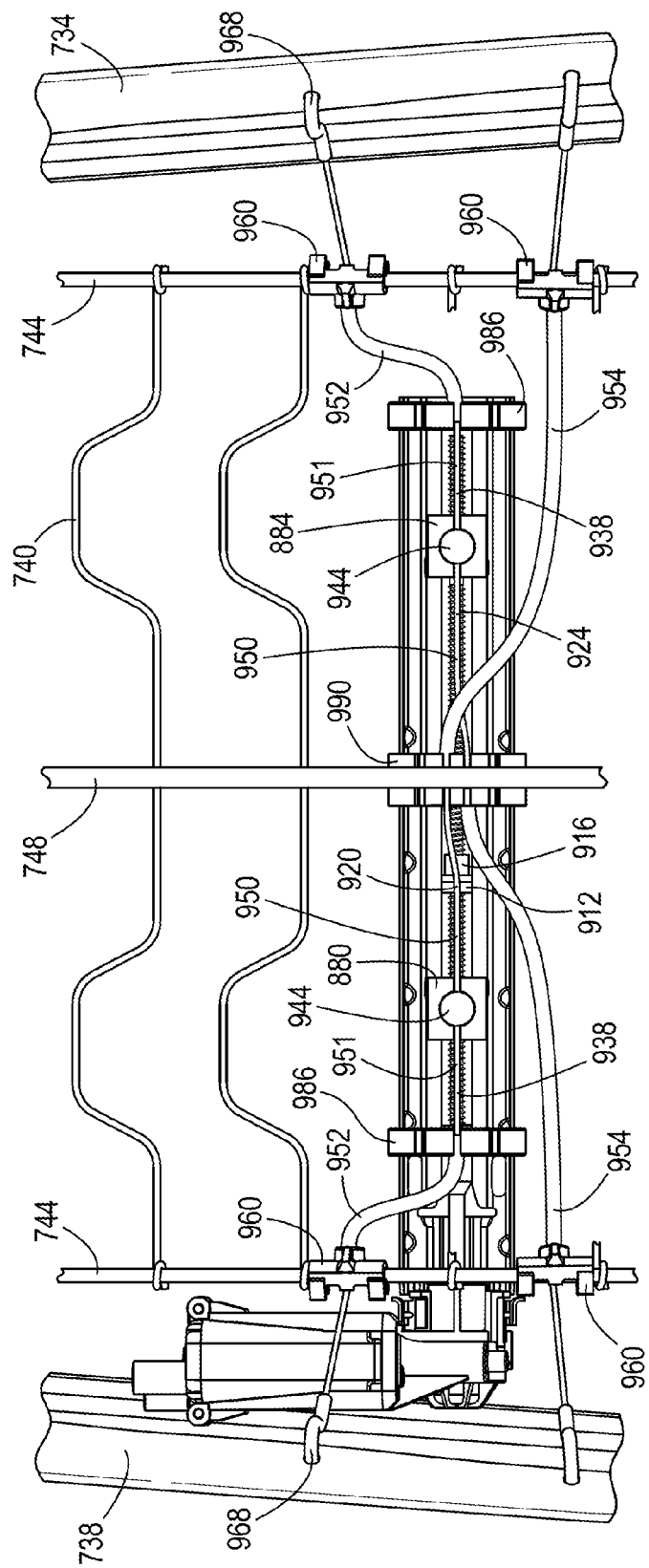
FIG. 17 is a partial front view of the lumbar support system of FIG. 14.
Figure 18:
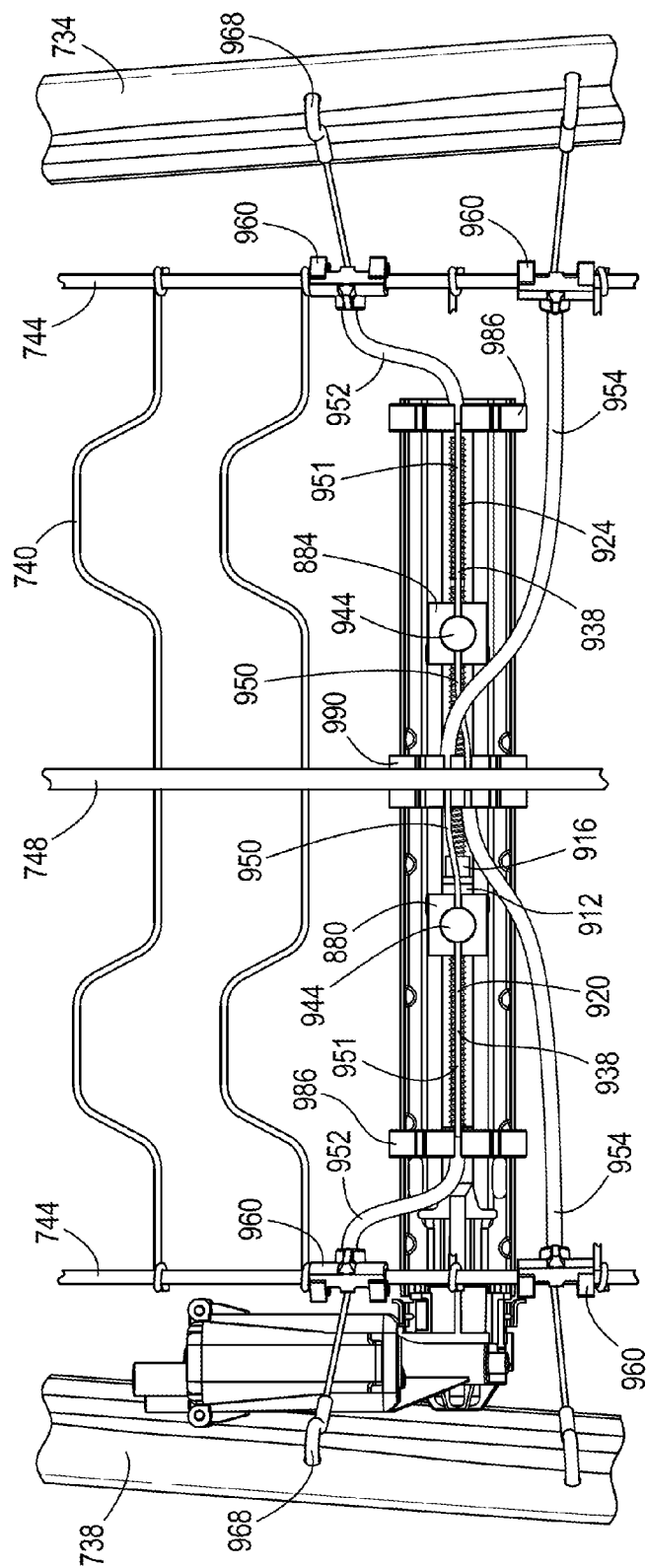
FIG. 18 is a partial front view of the lumbar support system of FIG. 14 in a first position.
Figure 19:
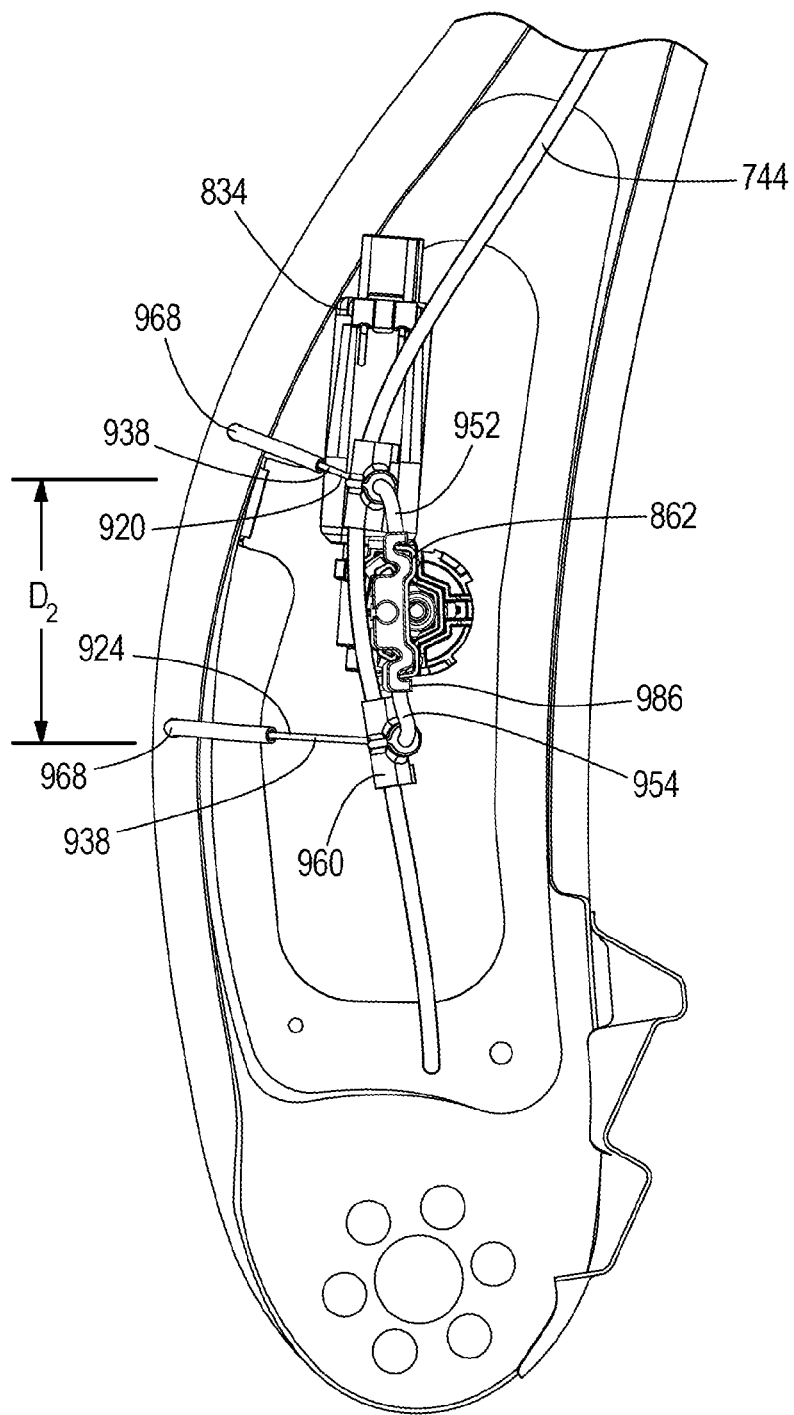
FIG. 19 is a partial side view of the lumbar support system of FIG. 14 in the first position.

Referring to FIG. 17, the lumbar mechanism 800 is shown in a medial position between the first position and the second position. To move the lumbar support mechanism 800 to the first position of FIGS. 18 and 19, the seat occupant activates the mechanism for clockwise rotation of the spindle 860 (viewed from the distal direction 824), which causes the proximal slider 880 to travel distally and the distal slider 884 to travel proximally along the spindle 860, i.e., the sliders 880, 884 approach each other. As the sliders 880, 884, with the respective connectors 944, converge, the second intermediate sections 951 of the cables 920, 924 are tensioned about the lateral outer wires 744 at the respective clips 960 in a manner similar to that described for FIG. 6 et seq., forcing the portion of the flexmat 740 spanned by the mechanism 800 in the upper lumbar region frontward, as shown in FIG. 19. Concurrently, the first intermediate sections 950 of the cables 920, 924 are relaxed, resulting in the seat occupant experiencing greater support in the upper lumbar region than in the lower lumbar region. When the proximal slider 880 contacts the bumper 912, the motor 834 stops, which ceases rotation of the spindle 860.

Figure 20:
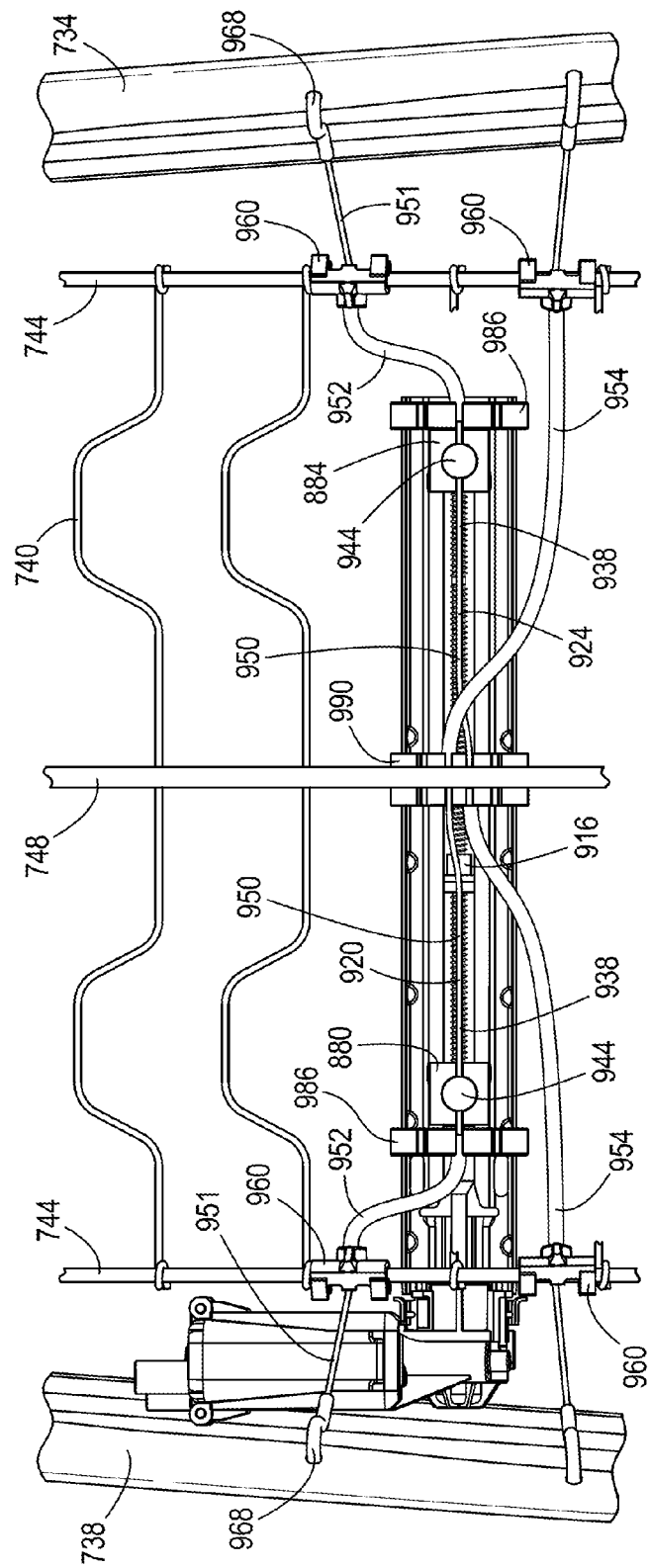
FIG. 20 is a partial front view of the lumbar support system of FIG. 14 in a second position.
Figure 21:
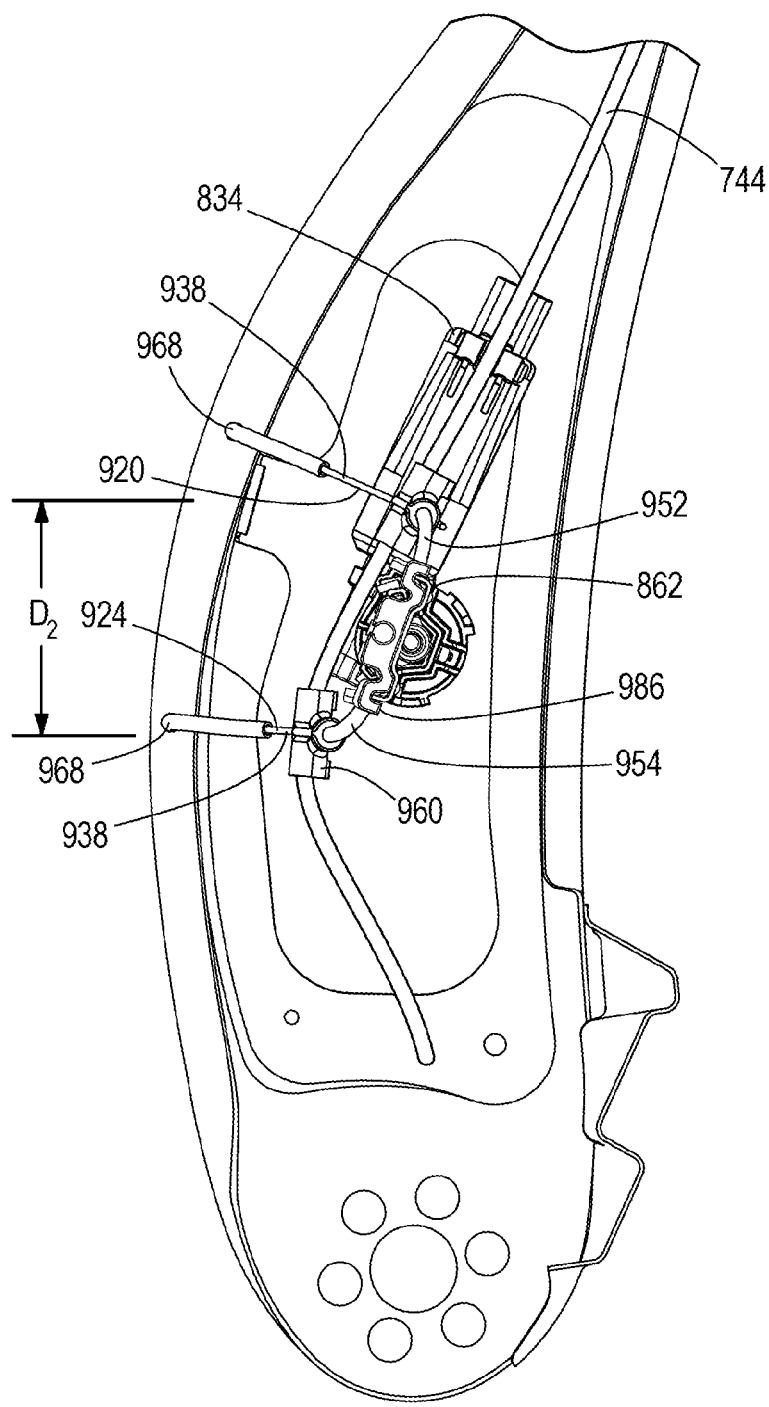
FIG. 21 is a partial side view of the lumbar support system of FIG. 14 in the second position.

To move the lumbar support mechanism 800 to the second position of FIGS. 20 and 21, the seat occupant activates the mechanism for counterclockwise rotation of the spindle 860 (viewed from the distal direction 824), which causes the proximal slider 880 to travel proximally and the distal slider 884 to travel distally along the spindle 860, i.e., the sliders 880, 884 separate. As the sliders 880, 884, with the respective connectors 944, diverge, the first intermediate sections 950 of the cables 920, 924 are tensioned about the lateral outer wires 744 at the respective clips 960 in a manner similar to that described for FIG. 6 et seq., forcing the portion of the flexmat 740 spanned by the mechanism 800 in the lower lumbar region frontward, as shown in FIG. 21. Concurrently, the second intermediate sections 951 of the cables 920, 924 are relaxed, resulting in the seat occupant experiencing greater support in the lower lumbar region than in the upper lumbar region. When the proximal slider 880 contacts the bumper 908, the motor 834 stops.

The vertical distance $D_2$ separating the upper lumbar region from the lower lumbar region, as illustrated in FIGS. 19 and 21, is approximately 70 mm, but can be of a greater or lesser magnitude for a particular application. In some constructions, the lumbar support mechanism 800 is configured to provide support only at the range limits illustrated in FIGS. 19 and 21. In other constructions, the mechanism 800 can operate and provide support at any position within the range illustrated in FIGS. 19 and 21.

Figure 22:
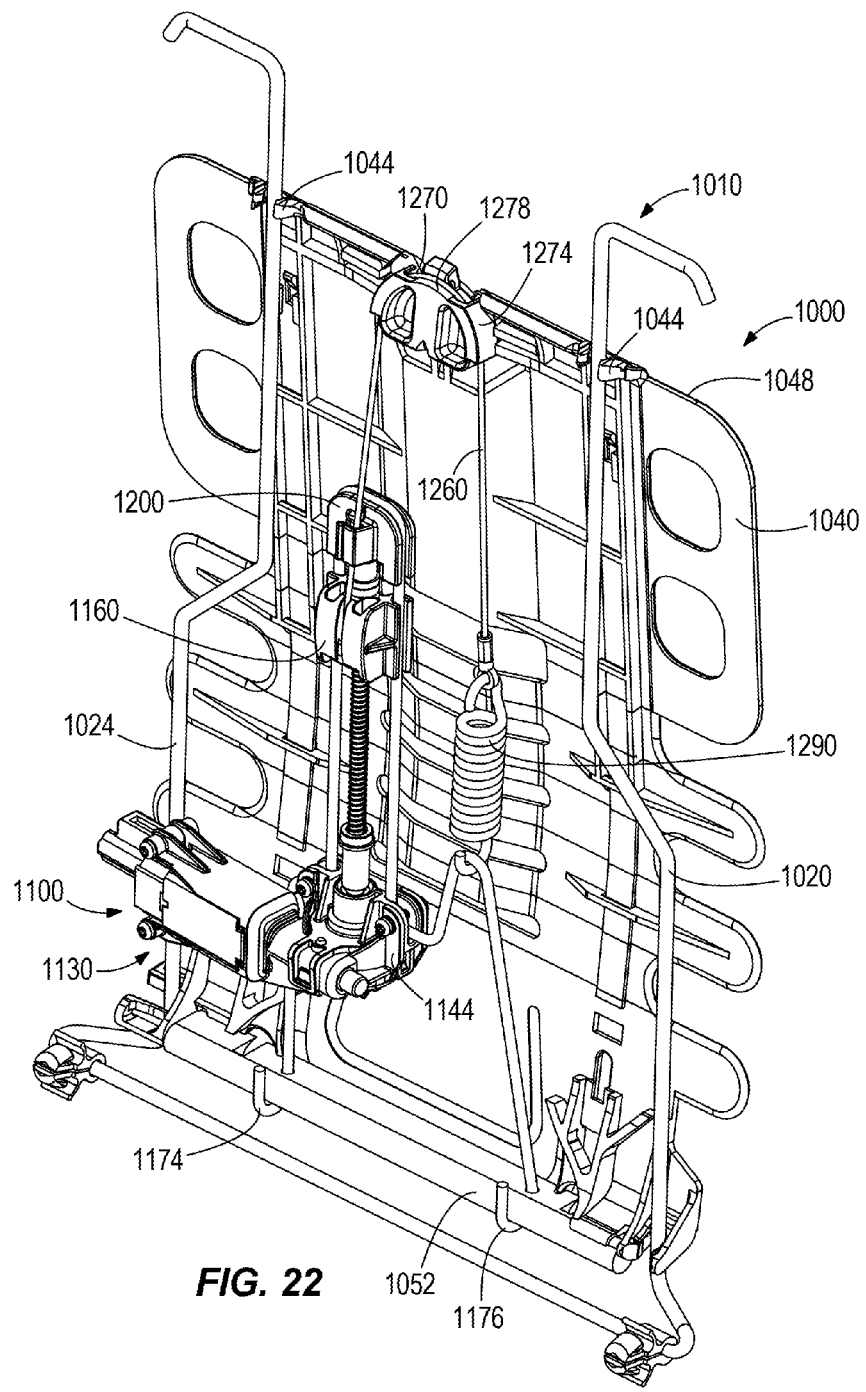
FIG. 22 is a perspective view of another lumbar support system for a vehicle seat.

FIG. 22 illustrates another lumbar support system 1000 for a vehicle seat, the general features of which have been previously described. The system 1000 includes a separate frame portion 1010 integrable with the seat and having vertical support members 1020, 1024 for mounting a flexible lumbar support element in the form of a basket 1040. The basket 1040 includes resilient connectors 1044 near a top edge 1048 to facilitate travel of a portion of the basket 1040 along the vertical support members 1020, 1024. As illustrated, the lumbar support system 1000 includes an adjustable lumbar support mechanism 1100.

Figure 23:
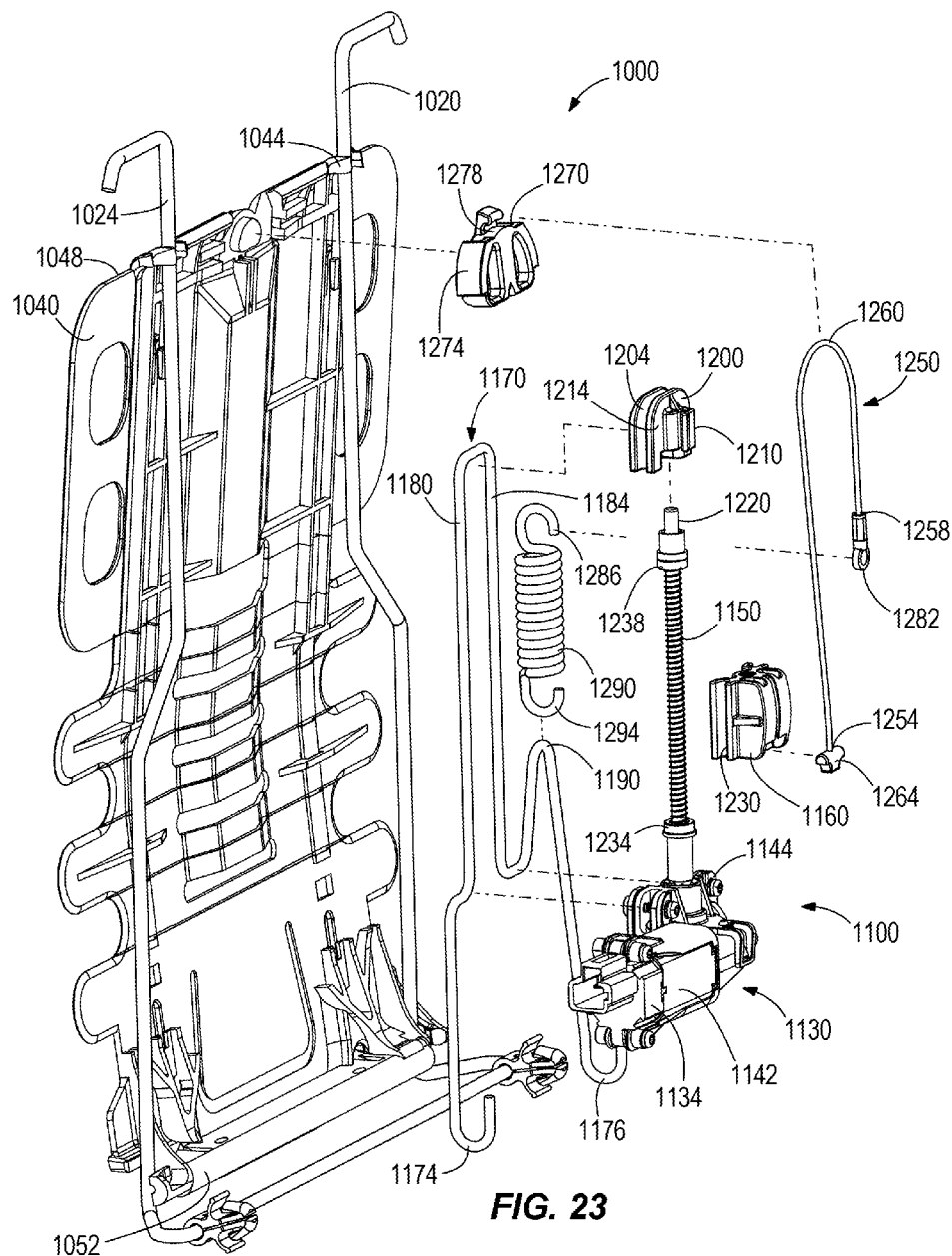
FIG. 23 is an exploded view of the lumbar support system of FIG. 22.

Referring also to FIG. 23, a drive assembly, or actuator 1130 similar to that shown in FIG. 3A includes a motor 1134, a housing 1142, a bracket 1144, and a worm gear arrangement (not shown) operable to rotate a threaded member, or spindle 1150, orthogonal to the motor drive shaft (not shown), i.e., the spindle 1150 is oriented in a generally vertical direction with respect to the seat. Positioned about the threads of the spindle 1150 is a traveling member or slider 1160 with an internally threaded body for engagement with the spindle 1150.

A rigid support wire 1170 includes a pair of hooks 1174, 1176 for engagement with a lower base member 1052 of the basket 1040 and a rail portion with first and second connected parallel rails 1180, 1184. The support wire 1170 further forms a loop 1190 between the rail 1184 and the hook 1176. An end piece 1200 with a semicircular groove 1204 sized to accommodate the rails 1180, 1184 includes a guide portion 1210 extending rearwardly from a first face 1214. The guide portion 1210 additionally seats the upper end 1220 of the spindle 1150. The support wire 1170 is operatively coupled to the drive assembly 1130 via the bracket 1144. Opposing channels 1230 of the slider 1160 mate with the rails 1180, 1184 of the support wire 1170 to enable translational motion of the slider 1160 during operation. A first bumper 1234 adjacent the bracket 1144 provides a first travel limit for the slider 1160, and a second bumper 1238 adjacent the guide portion 1210 provide a second travel limit, the limits defining the range of movement for the slider 1160.

A cable 1250 includes a first end 1254, a second end 1258, and a cable body 1260. The first end 1254 is integrally formed with or secured to a connector 1264 that couples to the body of the slider 1160 for movement therewith. The cable body 1260 extends from the first end 1254 through the guide portion 1210 toward the top edge 1048 of the basket 1040 and through a passage 1270 defined by a brace member 1274 approximately laterally centrally located near the edge 1048 of the basket 1040. The passage 1270 is formed with an arcuate cable contact portion 1278 such that the cable 1250 turns approximately 180° and proceeds downward in the direction of the lower base member 1052, i.e., the angle between the first and second ends 1254, 1258 is approximately 0° but may range from approximately 0° to approximately 15°. The second end 1258 of the cable 1250 is fixedly connected to an eyelet 1282, which receives a first end 1286 of a spring 1290 therethrough, the second end 1294 of which couples the spring 1290 to the loop 1190.

Figure 24:
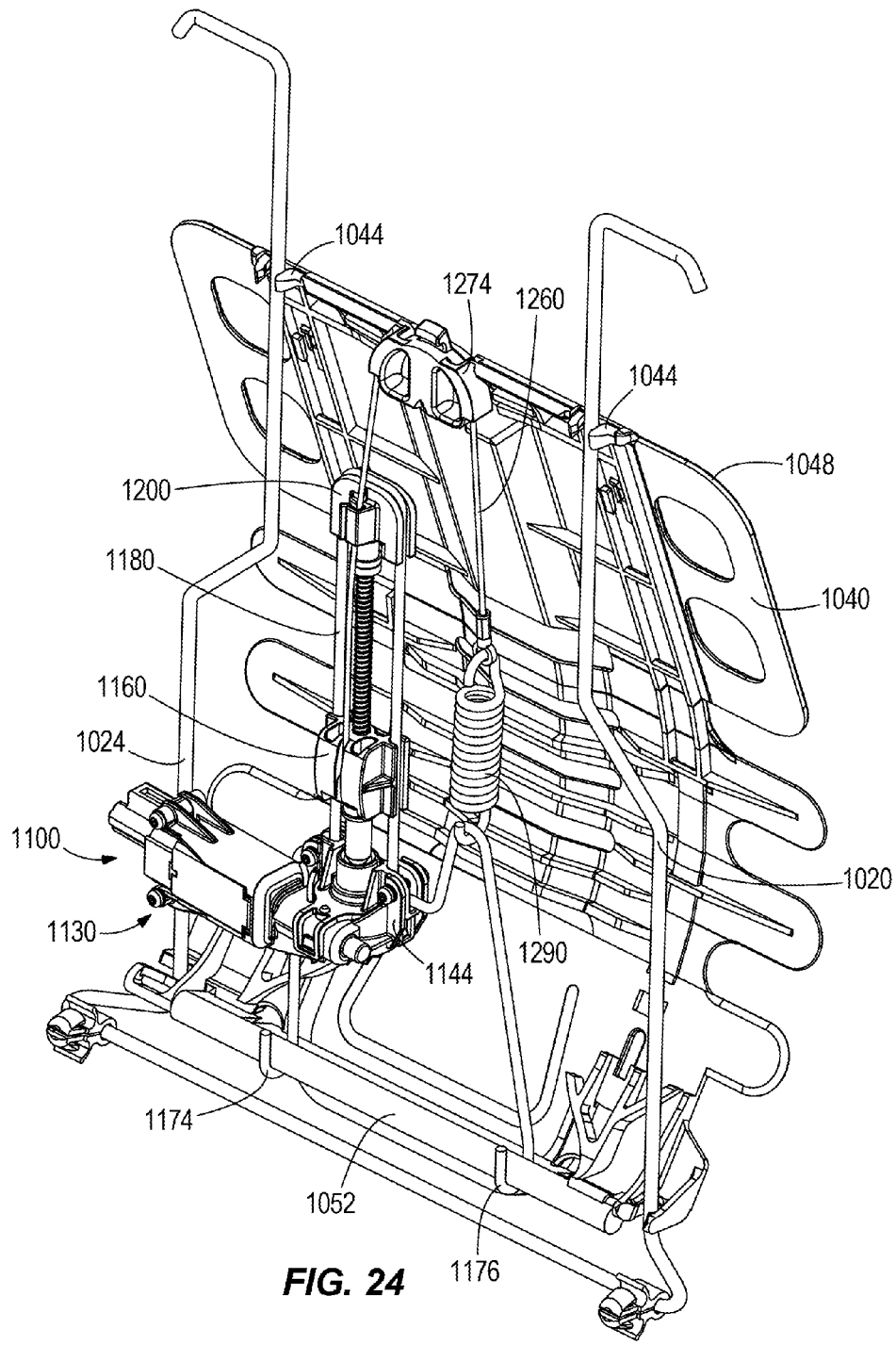
FIG. 24 is a perspective view of the lumbar support system of FIG. 22 in an extended position.

A seat occupant activates the actuator 1130 for the lumbar support mechanism 1100 using an electrically actuated switch located preferably adjacent the seat backrest or the seat bottom, as previously discussed for other embodiments. Referring to FIGS. 22 and 24 (and also 25 and 26), the mechanism 1100 can be in any position between fully refracted (FIG. 22) and fully extended (FIG. 24) when the actuator 1130 is initiated. Upon energizing the motor 1134, engagement of the worm gear rotates the drive shaft and concurrently turns the spindle 1150. If the lumbar support mechanism 1100 is activated to retract, i.e., provide less support, the spindle 1150 rotates in a first direction. If the lumbar support mechanism 1100 is activated to extend, i.e., provide more support, the spindle 1150 rotates in the opposite second direction. Activation in either direction is user selectable with the electrically actuated switch. Rotation of the spindle 1150 translates the slider 1160, the channels 1204 of which translate along the rails 1180, 1184.

To extend the lumbar support mechanism 1100, the seat occupant activates the mechanism to rotate the spindle 1150 in the second direction, which causes the slider 1160 to move downward toward the base member 1052. As the slider 1160 moves, the cable body 1260 contacts the arcuate portion 1278 of the brace 1274. The tension between the first and second ends 1254, 1258 of the cable 1250 acting through the cable body 1260 imparts a downward force on the brace 1274. Because the brace 1274 is fixedly secured to the basket 1040, specifically near the top edge 1048, while the cable 1250 is concurrently secured to the base member 1052 indirectly through the support wire 1170, the top edge 1048 of the basket 1040, facilitated by the resilient connectors 1044, slides down the vertical support members 1020, 1024 of the frame portion 1010, extending a lumbar contact area of the basket 1040 frontward to support a seat occupant's lumbar region, as shown in FIG. 24. When the slider 1160 contacts the bumper 1234, the motor 1134 stops, which ceases rotation of the spindle 1150.

Figure 25:
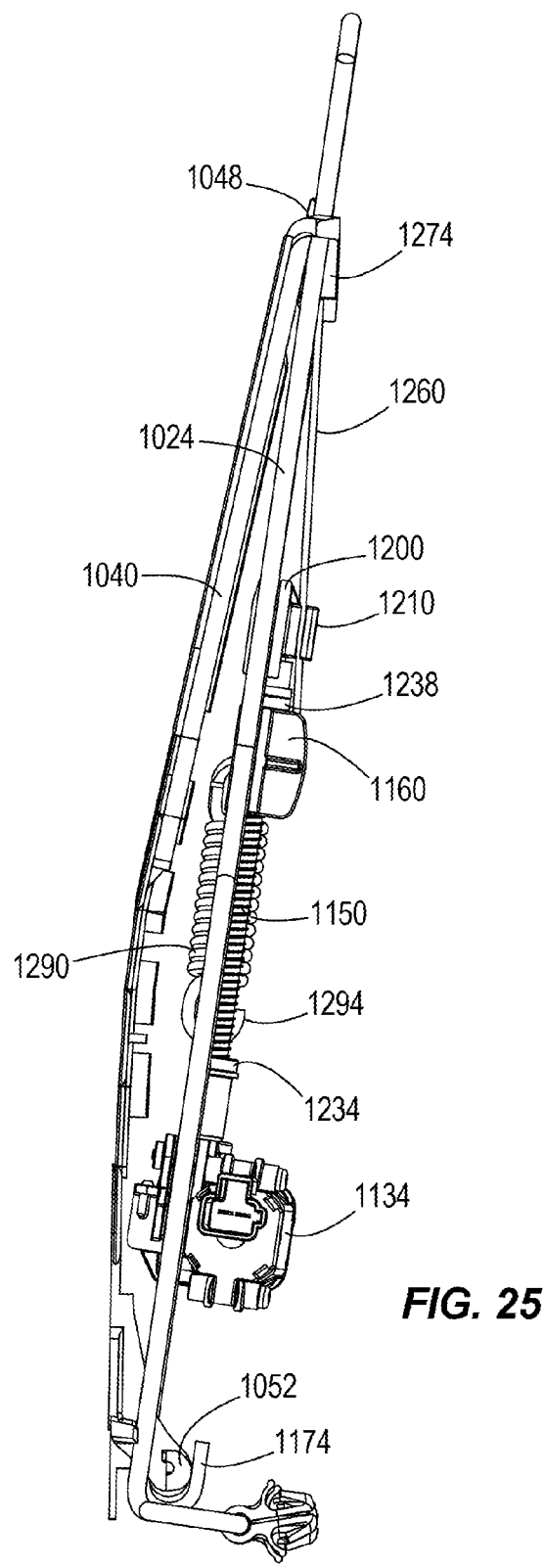
FIG. 25 is a side view of the lumbar support system of FIG. 22 in a retracted position.
Figure 26:
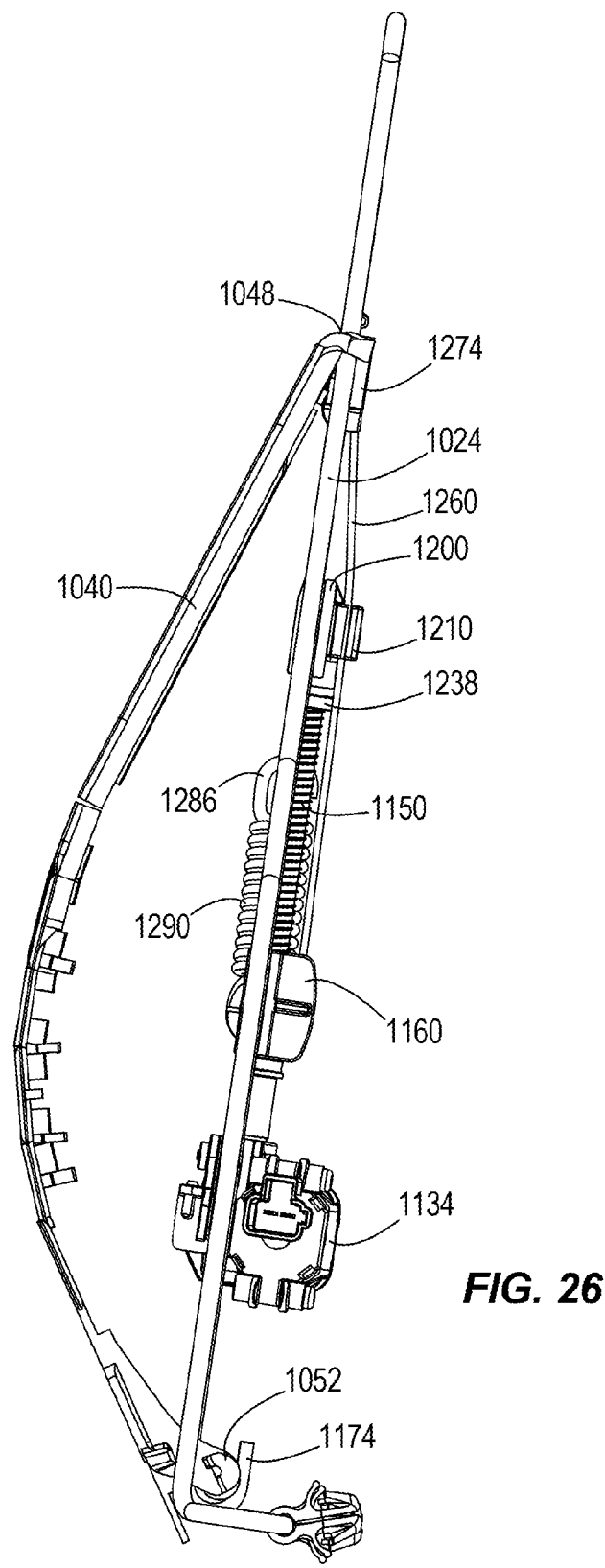
FIG. 26 is a side view of the lumbar support system of FIG. 22 in an extended position.

To retract the lumbar support mechanism 1100 to lessen the amount of lumbar support, the seat occupant activates the mechanism 1100 to rotate the spindle 1150 in the first direction, which causes the slider 1160 to move upward toward the top edge 1048. As the slider 1160 so travels, the pressure against the arcuate portion 1278 from the cable body 1260 lessens and the basket 1040 retracts rearward in response, which flexes the top edge 1048 upward along the vertical support members 1020, 1024, as further illustrated in FIGS. 25 and 26. When the slider 1160 contacts the bumper 1238, the motor 1134 stops, as previously described.

In some applications, the brace 1274 is replaced by a crosspiece (not shown) spanning at least a portion of the top edge 1048, preferably in the form of a second rigid wire that presents a coupling surface for the second end 1294 of the spring 1290. With a shorter cable 1250 than that shown and described in FIGS. 22-26, upon actuation of the motor 1134 to rotate the spindle 1150 and translate the slider 1160, the shorter cable 1250, rather than acting on a brace 1274 through the cable body 1260 as previously described, acts through the spring 1290 (i.e., the second end 1294) to directly apply a force to the crosspiece, and thus the top edge 1048 of the basket 1040, in order to identically extend and retract the basket 1040. In other words, the spring hook 1294 is attached to the crosspiece instead of the loop 1190 on the support wire 1170. Alternatively, in some applications the second end 1258 of the cable directly (without a spring 1290) applies a downward force on the top edge 1048 during operation.

Figure 27:
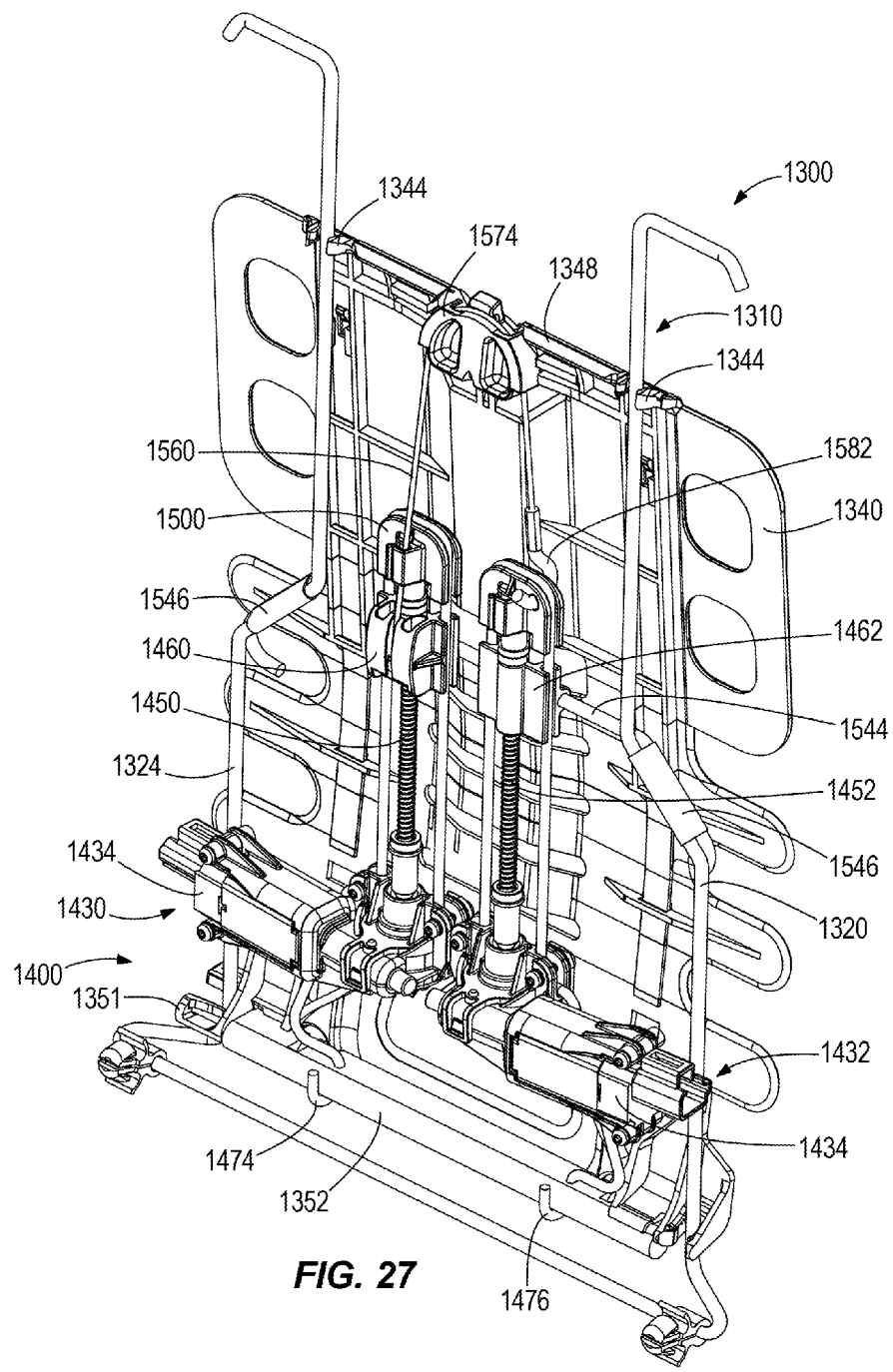
FIG. 27 is a perspective view of another lumbar support system for a vehicle seat.

FIG. 27 illustrates another lumbar support system 1300 for a vehicle seat with features similar to that of the system 1000. For clarity, the system 1300 will be numbered anew. The system 1300 includes a separate frame portion 1310 with vertical support members 1320, 1324 for mounting a flexible lumbar support basket 1340. The basket 1340 includes resilient connectors 1344 near a top edge 1348 and resilient connectors 1350, 1351 near a lower base member 1352 to facilitate travel of the basket 1340 along the vertical support members 1320, 1324. As illustrated, the lumbar support system 1300 includes an adjustable lumbar support mechanism 1400.

Figure 28:
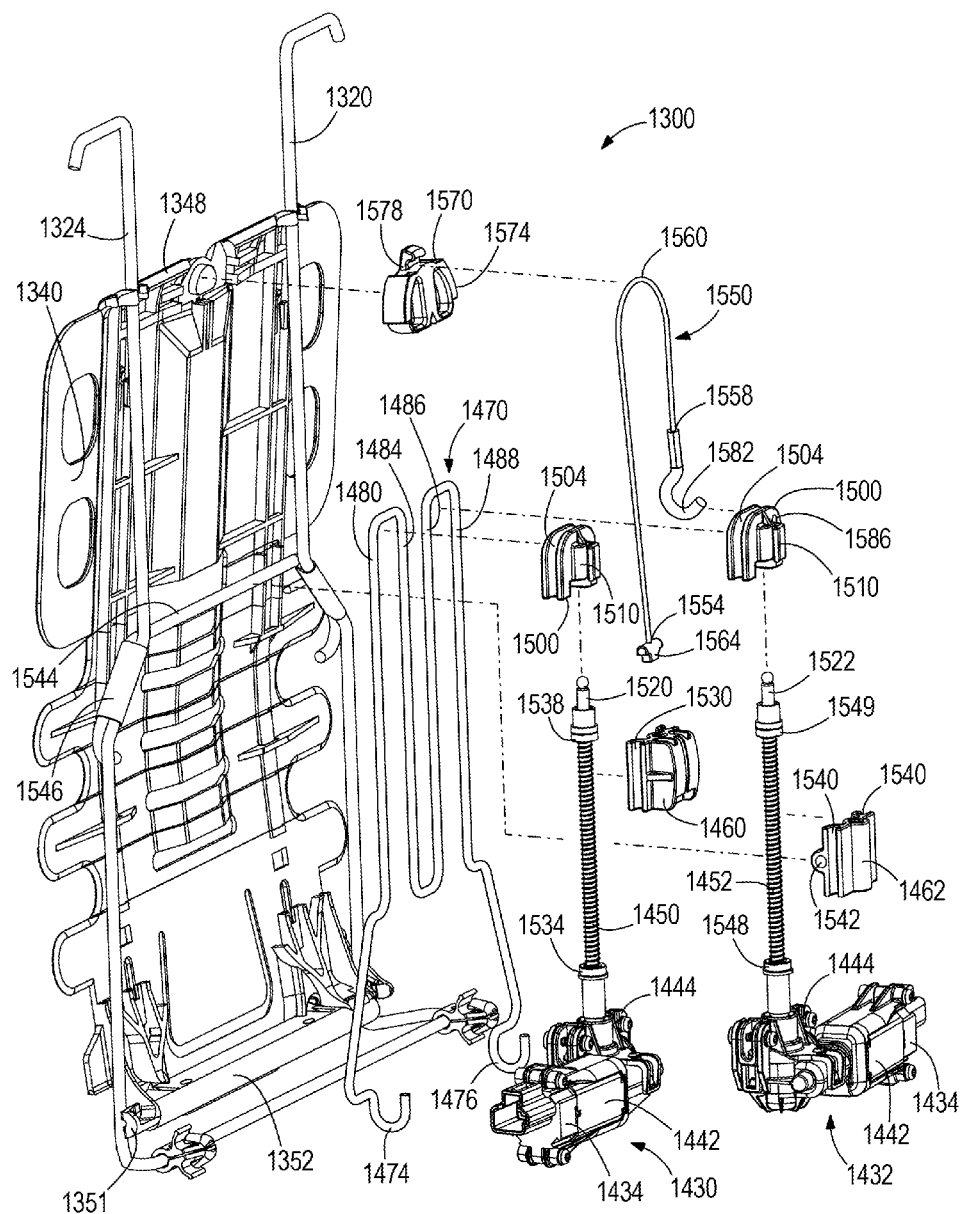
FIG. 28 is an exploded view of the lumbar support system of FIG. 27.

Referring also to FIG. 28, a pair of drive assemblies, or actuators 1430, 1432 similar to the actuator 1130 shown in FIGS. 22-23, each include a motor 1434, a housing 1442, a bracket 1444, and a worm gear arrangement (not shown) operable to rotate a threaded member, or spindle 1450, 1452, orthogonal to the respective motor drive shaft (not shown), i.e., the spindles 1450, 1452 are oriented in a generally vertical direction with respect to the seat. Positioned about the threads of the spindle 1450 is a slider 1460 with an internally threaded body for engagement with the spindle 1450. Positioned about the threads of the spindle 1452 is a block 1462 with an internally threaded body for engagement with the spindle 1452.

A rigid support wire 1470 includes a pair of hooks 1474, 1476 for engagement with the lower base member 1352 and a first rail portion with first and second connected parallel rails 1480, 1484 and a second rail portion with first and second connected parallel rails 1486, 1488. First and second end pieces 1500 with semicircular grooves 1504 sized to accommodate the rails 1180, 1184 and 1186, 1188, respectively, each include a rearwardly extending guide portion 1510. The guide portions 1510 of each end piece 1500 additionally seat the upper ends 1520, 1522 of the respective spindles 1450, 1452. The support wire 1470 is operatively coupled to the drive assemblies 1430, 1432 via the brackets 1444.

Opposing channels 1530 of the slider 1460 mate with the rails 1480, 1484 of the support wire 1470 to cause translational motion of the slider 1460 during operation. A first bumper 1534 adjacent the bracket 1444 provides a first travel limit for the slider 1460 and a second bumper 1538 adjacent the guide portion 1510 of the associated end piece 1500 provide a second travel limit, the limits defining the range of movement for the slider 1460.

Opposing channels 1540 of the block 1462 mate with rails 1486, 1488 of the support wire 1470. The block 1462 includes an aperture 1542 therethrough, which receives a crossbar 1544 coupled to and extending between the vertical support members 1320, 1324. The crossbar 1544 is fixed to the support members 1320, 1324 with bands 1546. Therefore, the block 1462 is also fixed relative to the frame portion 1310. A first bumper 1548 and a second bumper 1549 determine limits of travel associated with the block 1462, as will be further detailed.

A cable 1550 includes a first end 1554, a second end 1558, and a cable body 1560. The first end 1554 is integrally formed with or secured to a connector 1564 that couples to the body of the slider 1460 for movement therewith. The cable body 1560 extends from the first end 1554 through the guide portion 1510 of the associated end piece 1500 and toward the top edge 1348 of the basket 1340. The cable body 1560 passes through a passage 1570 defined by a brace member 1574 approximately laterally centrally located near the edge 1348 of the basket 1340. The passage 1570 is formed with an arcuate cable contact portion 1578 such that the cable 1550 turns approximately 180° and proceeds downward in the direction of the lower base member 1352, i.e., the angle between the first and second ends 1554, 1558 is approximately 0° but may range from approximately 0° to approximately 15°. The second end 1558 of the cable 1550 is fixedly connected to a hook 1582, which is received through an aperture 1586 of the end piece 1500 in contact with the spindle 1452.

Figure 29:
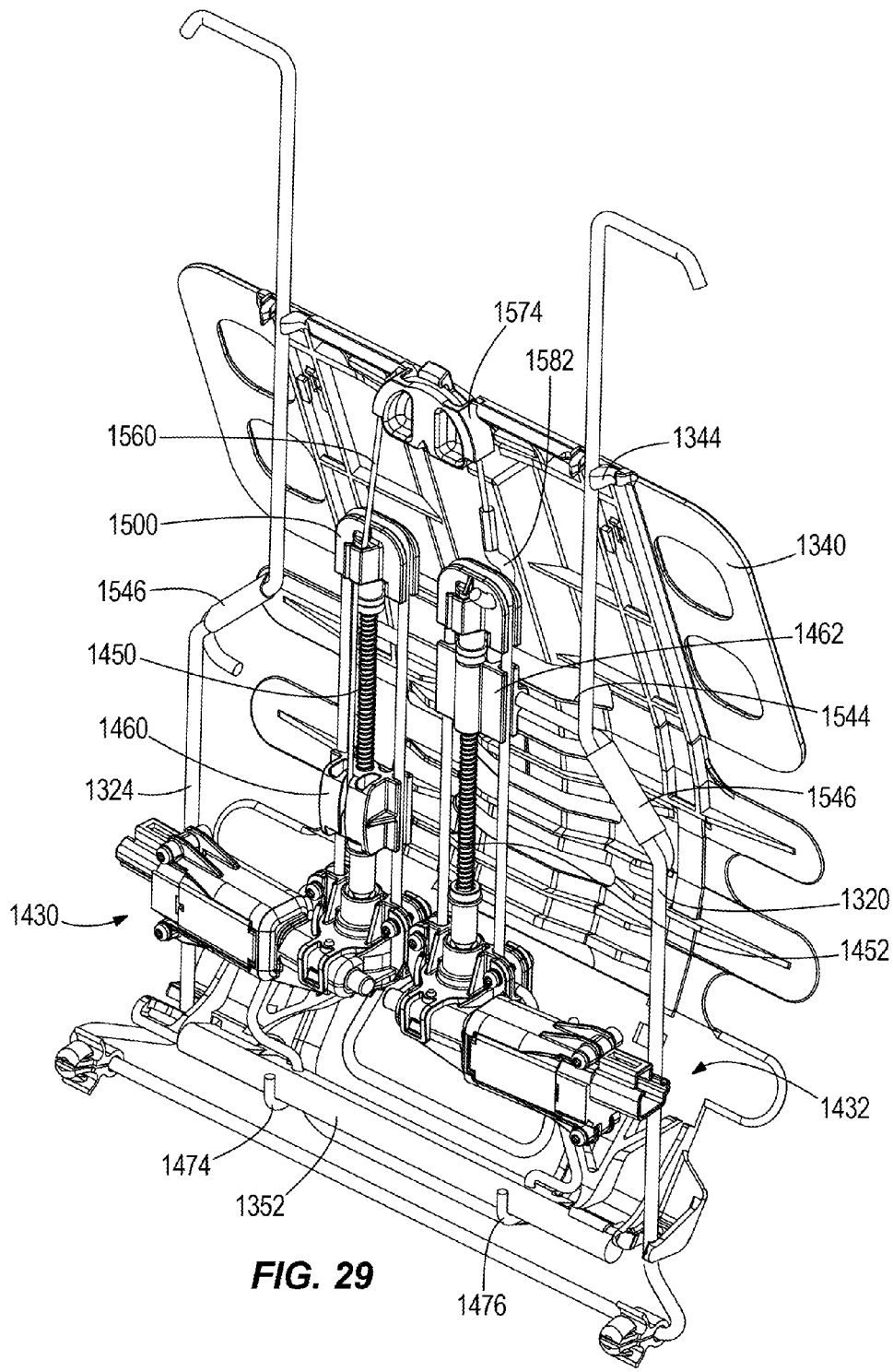
FIG. 29 is a perspective view of the lumbar support system of FIG. 27 in an extended and lowered position.

A seat occupant activates the actuators 1430, 1432 for the lumbar support mechanism 1400 using electrically actuated switches located preferably adjacent the seat backrest or the seat bottom, as previously discussed for other embodiments. Referring to FIGS. 27 and 29, the mechanism 1400 can be in any position between fully retracted (FIG. 27) and fully extended (FIG. 29) when the actuator 1430 is initiated. Upon energizing the motor 1434 of actuator 1430, engagement of the worm gear rotates the drive shaft and concurrently turns the spindle 1450. If the lumbar support mechanism 1400 is activated to retract, i.e., provide less support, the spindle 1450 rotates in a first direction. If the lumbar support mechanism 1400 is activated to extend, i.e., provide more support, the spindle 1450 rotates in the opposite second direction. Activation in either direction is user selectable with the electrically actuated switch. Rotation of the spindle 1450 translates the slider 1460, the channels 1504 of which interact with the rails 1480, 1484.

To extend the lumbar support mechanism 1400, the seat occupant activates the mechanism to rotate the spindle 1450 in the second direction, which causes the slider 1460 to move downward toward the base member 1352. As the slider 1460 moves, the cable body 1460 contacts the arcuate portion 1578 of the brace 1574. The tension between the first and second ends 1554, 1558 of the cable 1550 acting through the cable body 1560 imparts a downward force on the brace 1574. Because the brace 1574 is fixedly secured to the basket 1340, specifically near the top edge 1348, while the cable 1550 is concurrently secured to the base member 1352 indirectly through the support wire 1470, the top edge 1348 of the basket 1340, facilitated by the resilient connectors 1344, slides down the vertical support members 1320, 1324 of the frame portion 1310, extending a lumbar contact area of the basket 1340 frontward to support a seat occupant's lumbar region, as shown in FIG. 29. When the slider 1460 contacts the bumper 1534, the motor 1434 of the actuator 1430 stops, which ceases rotation of the spindle 1450.

To retract the lumbar support mechanism 1400 to lessen the amount of lumbar support, the seat occupant activates the mechanism 1400 to rotate the spindle 1450 in the first direction, which causes the slider 1460 to move upward toward the top edge 1348. As the slider 1460 so travels, the pressure against the arcuate portion 1578 from the cable body 1560 lessens and the basket 1340 retracts rearward in response, which flexes the top edge 1348 upward along the vertical support members 1320, 1324. When the slider 1460 contacts the bumper 1538, the motor 1434 of the actuator 1430 stops, as previously described.

Figure 30:
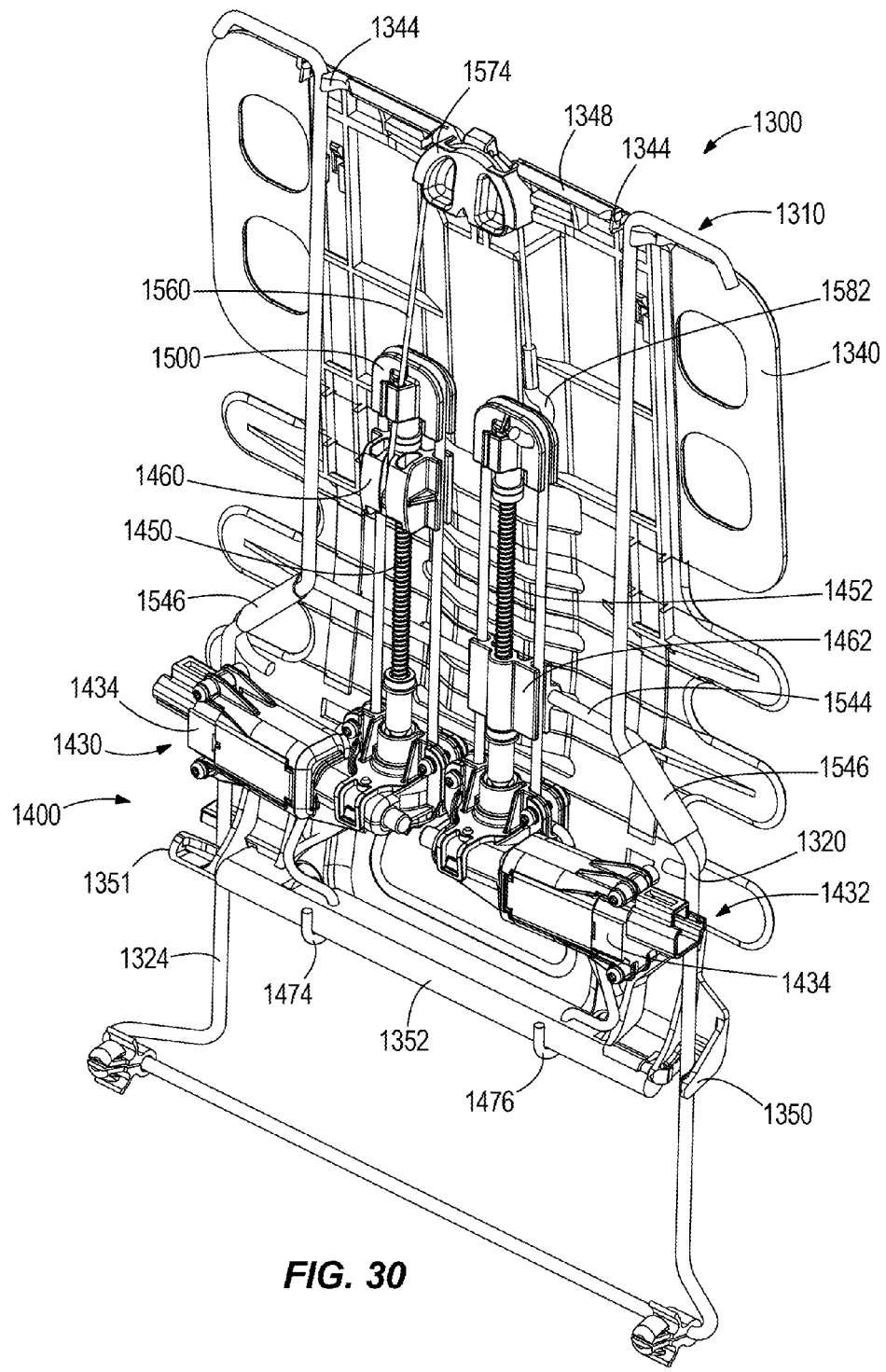
FIG. 30 is a perspective view of the lumbar support system of FIG. 27 in a retracted and raised position.

Referring to FIGS. 27 and 30, the support mechanism 1400 and basket 1340 are vertically adjustable to permit the seat occupant flexibility to position the basket 1340 as desired. The mechanism 1400 can be in any position between fully lowered (FIG. 27) and fully raised (FIG. 30) when the actuator 1432 is initiated. Upon energizing the motor 1434 of actuator 1432, engagement of the worm gear rotates the drive shaft and concurrently turns the spindle 1452. If the lumbar support mechanism 1400 is activated to lower, the spindle 1452 rotates in a first direction. If the lumbar support mechanism 1400 is activated to raise, the spindle 1452 rotates in the opposite second direction. Activation in either direction is user selectable with an electrically actuated switch. Rotation of the spindle 1452 translates the mechanism 1400 and basket 1340 relative to the fixed block 1462, the channels 1540 of which interact with the rails 1486, 1488.

To raise the lumbar support mechanism 1400 and the support 1340, the seat occupant activates the mechanism to rotate the spindle 1452 in the second direction. The interaction of the threads of the spindle 1452 with the threads of the block 1462, which is fixed to the frame portion 1310, causes the entire mechanism 1400 and basket 1340 to translate upward relative to the block 1462. With no additional actuation of the actuator 1430, the degree of extension of the basket 1340 remains unchanged as the tension within the cable 1550 is maintained. The connectors 1344, 1350, 1351 operably contact the vertical support members 1320, 1324 to permit and guide the upward motion of the basket 1340 to vertically position the lumbar contact area of the basket 1340 as desired. When the bumper 1548 contacts the block 1462, the motor 1434 of the actuator 1432 stops, which ceases rotation of the spindle 1452. To lower the lumbar support mechanism 1400 the seat occupant activates the mechanism 1400 to rotate the spindle 1452 in the first direction, which causes the mechanism 1400 and basket 1340 to translate downward relative to the block 1462. When the bumper 1549 contacts the block 1462, the motor 1434 of the actuator 1432 stops, as previously described.

Figure 31:
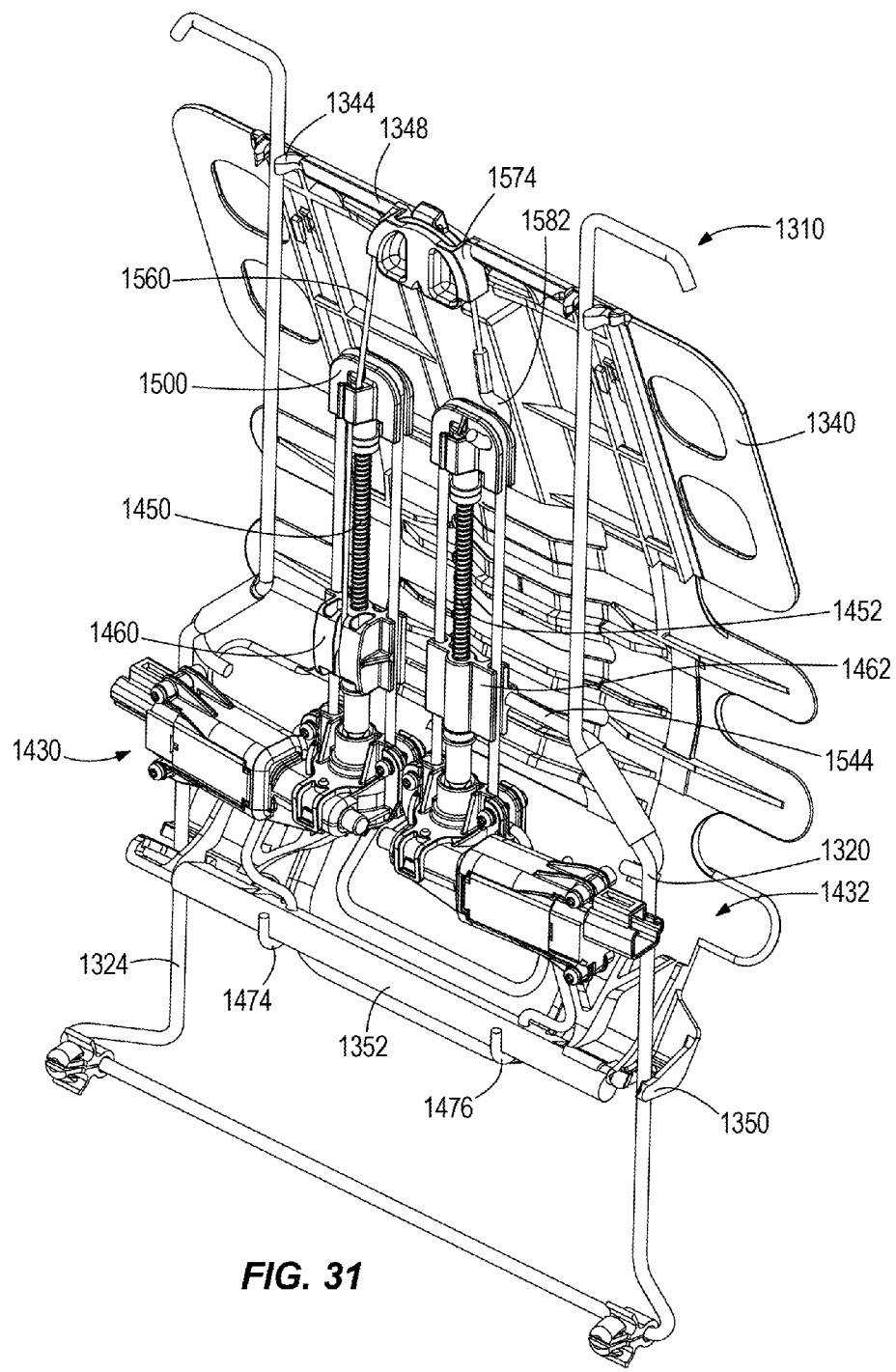
FIG. 31 is a perspective view of the lumbar support system of FIG. 27 in an extended and raised position.

Referring to FIGS. 30 and 31, the basket 1340 is fully retractable and extendable, through activation of the actuator 1430 as previously described, at any height within the vertical range determined by the bumpers 1548, 1549. Separate operation of the actuators 1430, 1432 is not required such that vertical adjustment and retraction/extension can be accomplished concurrently.

Figure 32:
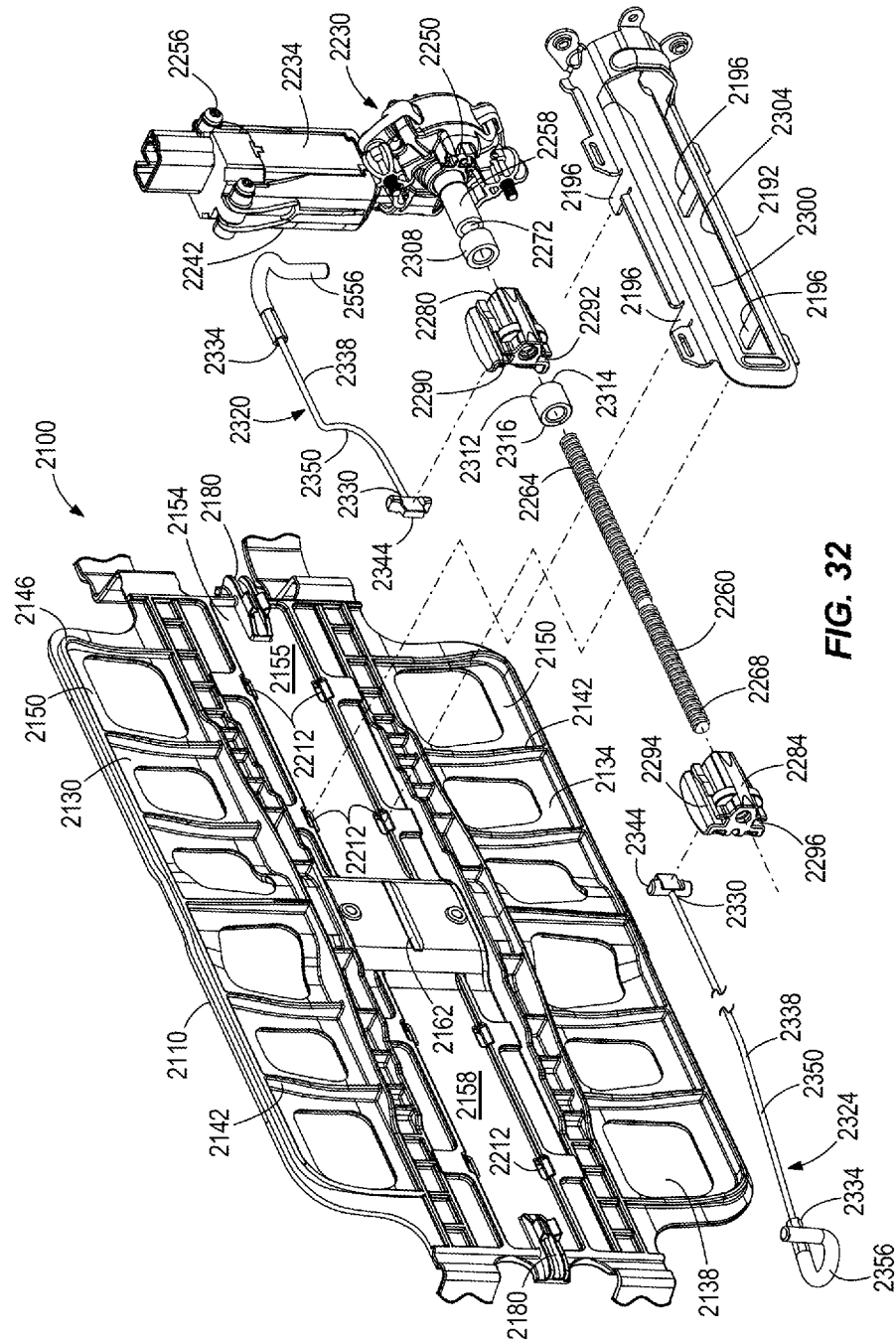
FIG. 32 is an exploded view of another lumbar support system.
Figure 33:
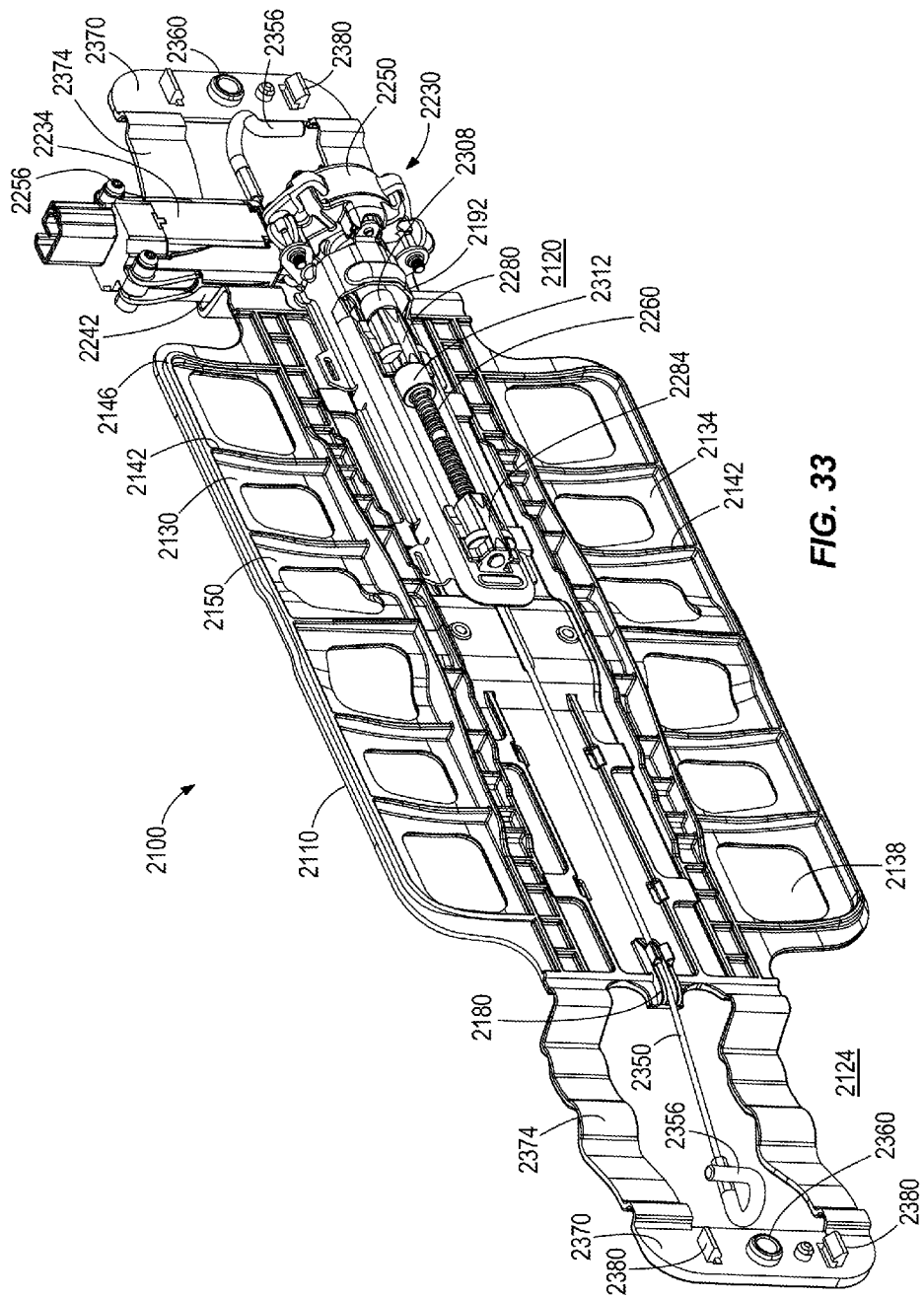
FIG. 33 is a rear perspective view of the lumbar support system of FIG. 32.
Figure 34:
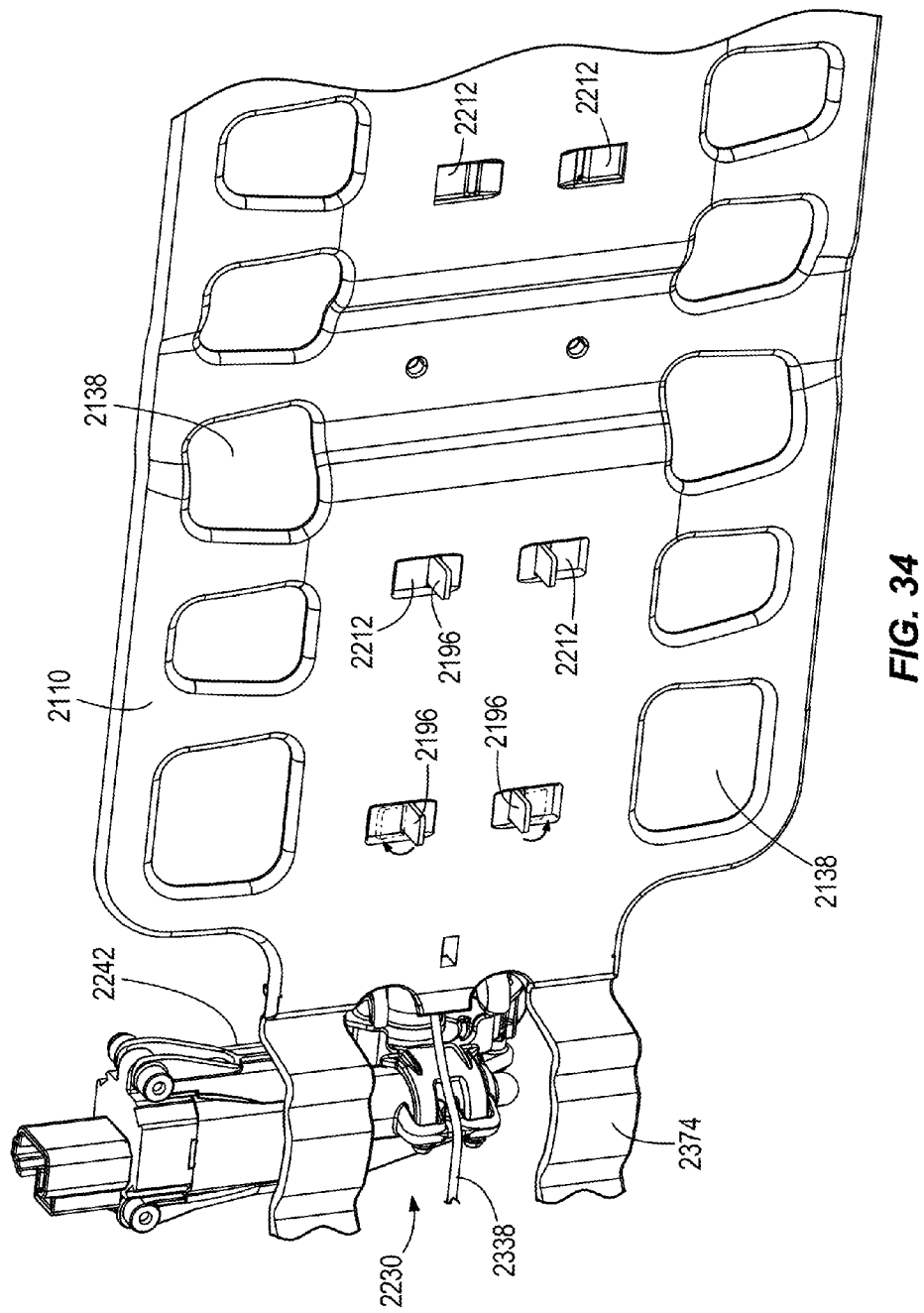
FIG. 34 is a partial front perspective view of the lumbar support system of FIG. 32.

FIGS. 32-34 illustrate a lumbar support system 2100 referenced with respect to a proximal end 2120 and a distal end 2124. Upper and lower portions 2130, 2134 of a basket 2110 are formed to include a plurality of apertures 2138 separated by stiffening ribs 2142 generally interconnected by a border 2146 on the rear face 2150 of the basket 2110. A central portion 2154 of the basket 2110 between the upper and lower portions 2130, 2134 includes a mounting face 2158. The mounting face 2158 supports an intermediate guide 2162 and opposing cable channels 2180, the purpose of which will be described below.

A spindle rail 2192 includes a set of upper and lower tabs 2196 oriented generally perpendicular to the mounting face 2158, which includes a plurality of corresponding slots 2212 As shown in FIG. 34, the tabs 2196 and slots 2212 are so situated that upon assembly, the tabs 2196 project through the slots 2212 and are then turned or bent upward or downward to permanently secure the spindle rail 2192 to the basket 2110. The lumbar support system 2100 uses no other fasteners, brackets, or other hardware to secure the spindle rail 2192 to the basket 2110.

A drive assembly, or actuator 2230 includes a motor 2234, a housing 2242, and a cap 2250 containing a worm gear and drive shaft, all of which are similar to that of actuator 230. The motor 2234, secured to the housing 2242 with fasteners 2256, is preferably a D.C. reversible motor but can be any type of reversible motor suitable for the application and can further be varied in size and power as necessary. A drive shaft (not shown) mates with the worm gear for co-rotation and transfer of power during operation. The drive shaft ends in a receptacle 2258. The cap 2250 secures the motor 2234 to the spindle rail 2192.

Coupled to the drive shaft and spanning a portion of the spindle rail 2192 is a threaded member, or spindle 2260. The spindle 2260 has proximal and distal threaded ends 2264, 2268. As illustrated, the proximal threads are right-hand threads and the distal threads are left-hand threads, though the handedness can be reversed in alternative embodiments. The proximal threaded end 2264 is received within and rotationally secured to (e.g., through crimping) an opening 2272 of the receptacle 2258 such that the spindle 2260 rotates with the drive shaft upon actuation of the motor 2234. Positioned about each threaded end 2264, 2268 of the spindle 2260 is a traveling member, or slider, i.e., a proximal slider 2280 and a distal slider 2284. Each slider 2280, 2284 has an internally threaded body for engagement with the spindle 2260 and opposing grooves 2290, 2292, 2294, 2296, respectively, which mate with opposing edges 2300, 2304 formed as part of the spindle rail 2192. The oppositely threaded spindle ends 2264, 2268 together with the groove/edge interface of the sliders 2280, 2284 with the spindle rail 2192 cause opposed translational motion of the sliders 2280, 2284 along the spindle 2260 upon spindle rotation.

A bumper 2308 located adjacent the receptacle 2258 provides the limit of one end of travel for the proximal slider 2280. A spacer 2312 having a proximal end 2314 and a distal end 2316 is positioned about the spindle 2260 between the sliders 2280, 2284. Specifically, both the bumper 2308 and the spacer 2312 include a generally smooth inner surface without internal threads and are configured to slide or "float" over the spindle 2260, i.e., neither the bumper 2308 nor the spacer 2312 threadingly engages the proximal or distal threads of the spindle 2260, as will be further explained. The length of the spacer 2312 can vary depending on the particular application and a particular length can be color-coded for reference during system assembly. The spacer 2312 establishes a second limit of travel and defines the range of movement for the sliders 2280, 2284.

Proximal and distal flexible cables 2320, 2324 are coupled to the proximal slider 2280 and the distal slider 2284, respectively. Each cable 2320, 2324 includes a first end 2330, a second end 2334, and a cable body 2338. The first end 2330 has a connector 2344 that fits within the body of the respective slider 2280, 2284 for movement therewith. The cable body 2338 of each cable 2320, 2324 extends from the first end 2330 and defines an intermediate section 2350, a portion of which is positioned within each respective channel 2180. The intermediate section 2350 of the distal cable 2324 of the proximal lumbar support mechanism 2100 is longer than the intermediate section 2350 of the proximal cable 2320 of the same lumbar support mechanism. In some embodiments, this longer intermediate section 2350 of the cable 2324 is situated within a rigid sleeve (not shown) having an inside diameter larger than the diameter of the cable 2324 to permit free movement of the cable 2324 within. The intermediate section 2350 of each cable 2320, 2324 terminates at the second end 2334 coupled to a hook fitting 2356.

Referring to FIG. 33, the hook fittings 2356 are each configured to pass through an orifice 2360 of and be secured to an end 2370 of a hinge 2374. The hinge 2374 is a "living" hinge that adjoins the basket 2110 at both the upper and lower portions 2130, 2134 opposite the end 2370. As illustrated, the hinge 2374 includes multiple pivots points positioned to preclude interference with the motor 2234 during the course of travel of the basket 2110. The hinge 2374 and the basket 2110 are preferably formed as a unitary piece. Alternatively, the hinge 2374 can be a separate piece secured to the basket 2110 in a manner known to those of skill in the art. Each end 2370 of the hinge 2374 includes a pair of flexible snap hooks 2380 configured for connection to a portion of the respective vertical support member 34, 38 of the frame 26 (see, e.g., FIG. 1). Although not shown, springs coupled with one or both of the cables 2320, 2324 in series can permit a limited amount of flexion and provide "give" to an occupant to enhance the comfort of the device.

The mounting of the spindle rail 2192 to the basket 2110 previously described serves as the only manner of fastening the aforementioned components of the lumbar support system 2100 (less the basket 2110) to the vehicle.

In operation, a seat occupant activates the power actuator 2230 using an electrically actuated switch. Operation proceeds similarly to that of lumbar support system 100, i.e., between a fully refracted position and a fully extended position. If the lumbar support system 2100 is activated to retract the basket 2110, the spindle 2260 rotates in a first direction. If the lumbar support system 2100 is activated to extend the basket 2110, the spindle 2260 rotates in a second, opposite direction. Activation in either direction is user selectable with the electrically actuated switch. Due to the interaction of the grooves 2290, 2292, 2294, 2296 of the sliders 2280, 2284 with the edges 2300, 2304 of the spindle rail 2192, rotation of the spindle 2260 translates the sliders 2280, 2284, one of which travels in the proximate direction (2120) and the other of which travels in the distal direction (2124).

If the occupant desires extension of the basket 2110 to provide more lumbar support, clockwise rotation of the spindle 2260 (viewed from the distal direction 2124) causes the proximal slider 2280 to travel distally and the distal slider 2284 to travel proximally along the spindle 2260, i.e., the sliders 2280, 2284 and their respective attached cables 2320, 2324 approach each other. As the sliders 2280, 2284 converge, portions of the intermediate sections 2350 of each cable slide within their respective channels 2180, contacting the basket 2110. This contact results in a force against the basket 2110 directing the basket frontward. During the initial movement of the proximal slider 2280 in the distal direction, the proximal slider 2280 contacts the proximal end 2314 of the spacer 2312 and concurrently moves the spacer 2312 distally. When the distal end 2316 of the spacer 2312 contacts the distal slider 2284, the motor 2234 stops, ceasing rotation of the spindle 260. Other methods of de-energizing the motor 2234 at a certain point of travel, commonly known to those of skill in the art, are also possible for use with the lumbar support system 2100. The hinges 2374, which are anchored to respective vertical support members, facilitate movement of the basket 2110 by flexing to provide a smooth motion throughout the range of travel.

If the occupant desires retraction of the basket 2110 to lessen the amount of lumbar support, counterclockwise rotation of the spindle 2260 causes the proximal slider 2280 to travel proximally and the distal slider 2284 to travel distally along the spindle 2260, i.e., the sliders 2280, 2284 and their respective attached cables 2320, 2324 separate. As the sliders 2280, 2284 move farther apart, pressure against the basket 2110 from the intermediate sections 2350 of the cables lessens and the basket 2110 retracts rearward in response. When the slider 2280 contacts the bumper 2308, the motor 2234 stops as previously described. The spacer 2312, which is free to float along the spindle 2260, generally remains in place midway between the sliders 2280, 2284 during subsequent movement of the sliders 2280, 2284.

During the course of travel of the basket 2110, the cables 2320, 2324 remain disposed in substantially the same plane from retraction to extension and back, and an angle α (see FIG. 4) between the first end 2330 and the second end 2334 of each cable 2320, 2324 remains obtuse.

Figure 35:
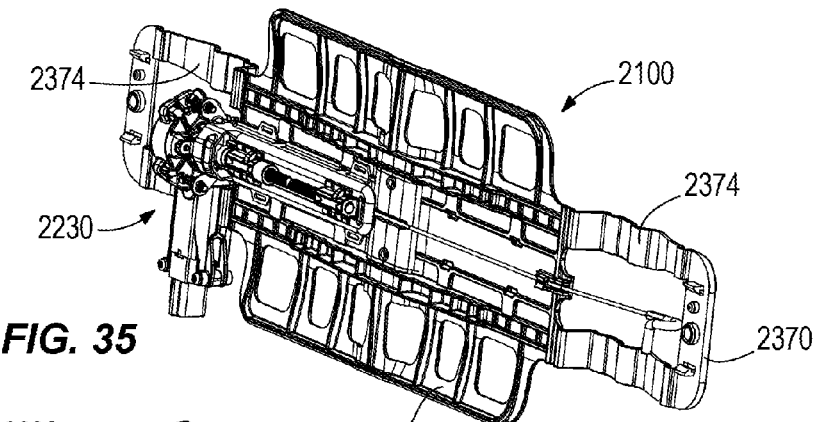
FIGS. 35-37 are perspective views of three additional orientations of the lumbar support system of FIG. 32.
Figure 36:
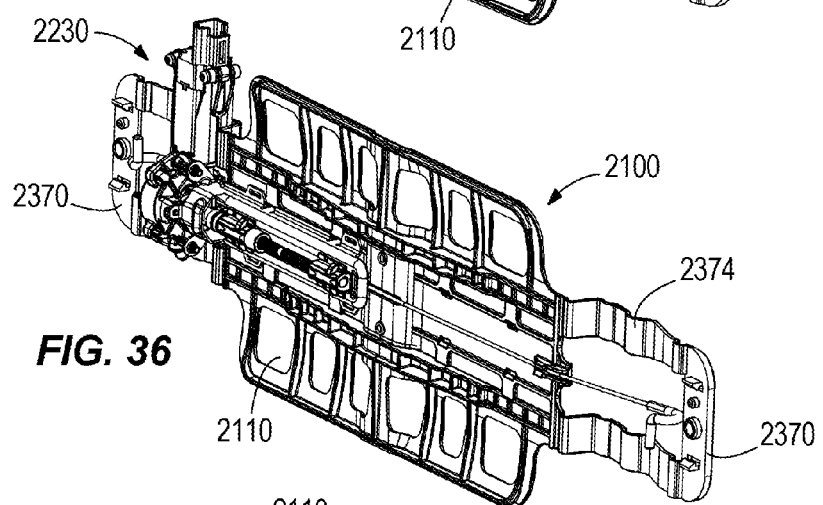
Figure 37:
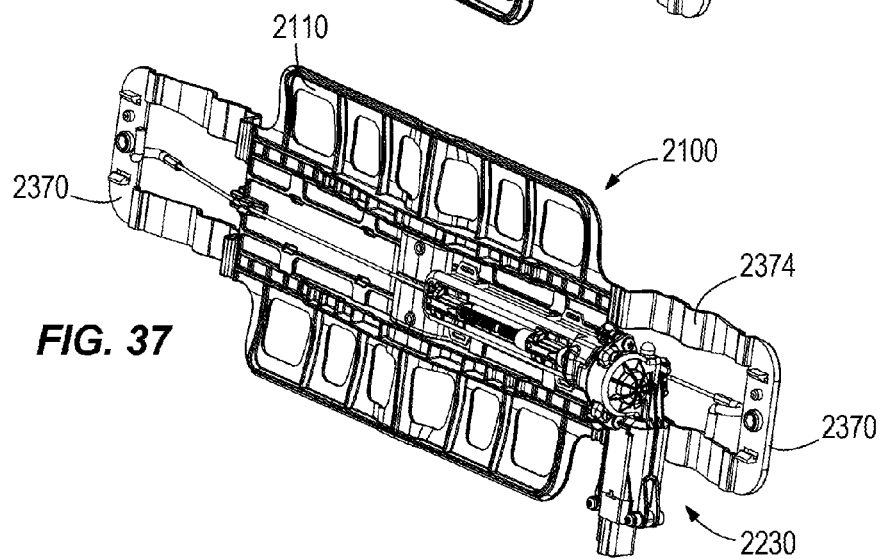

FIGS. 35-37 illustrate the modular nature of the lumbar support system 2100. The basket 2110 is configured to support the spindle rail 2192 at both the proximal and distal positions on the mounting face 2158, and the actuator 2230 is mountable to the spindle rail 2192 in two possible orientations. Thus, as shown, the system 2100 can be configured four possible ways depending on the vehicle parameters or constraints for a particular application.

Figure 38:
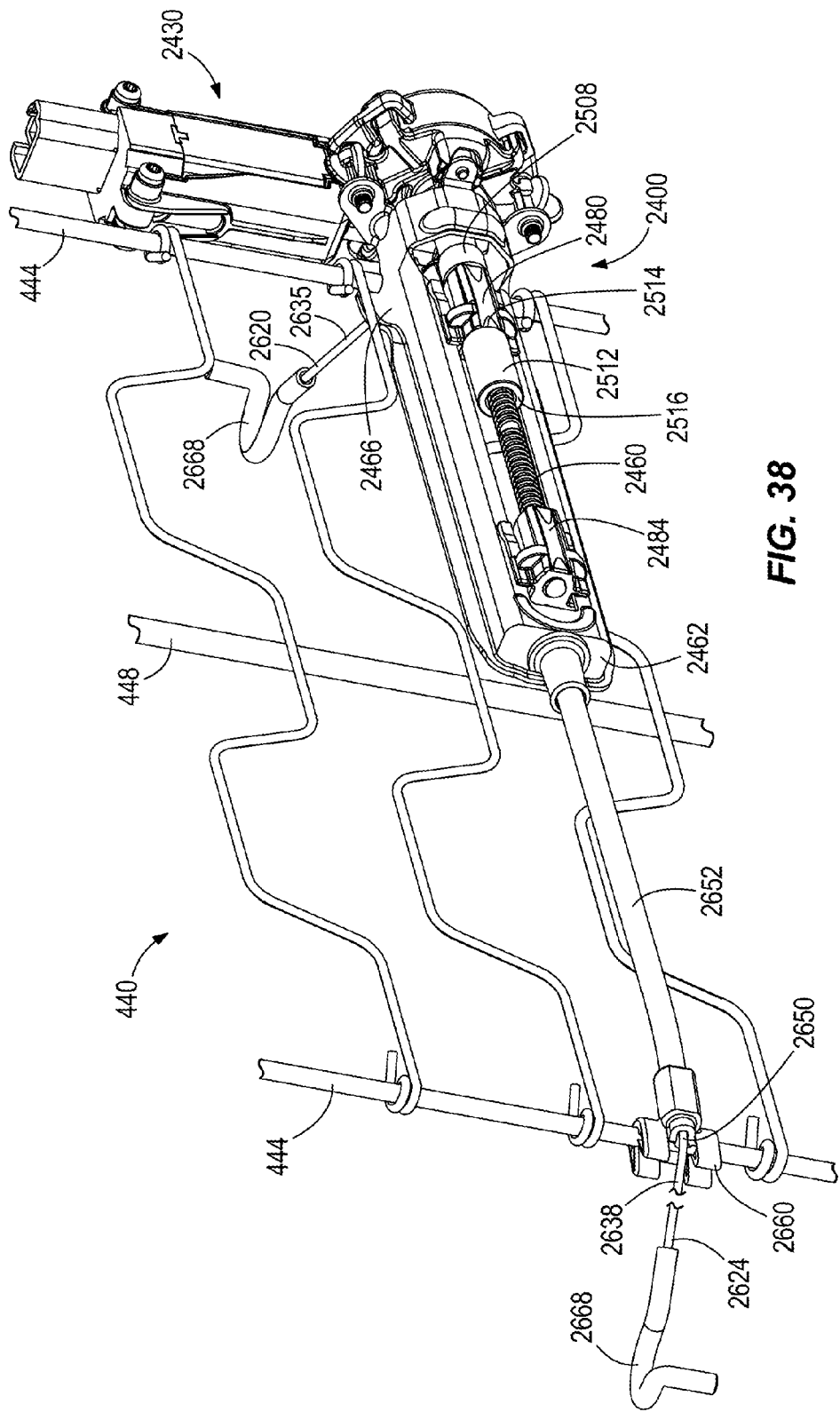
FIG. 38 is a rear perspective view of another lumbar support system.
Figure 39:
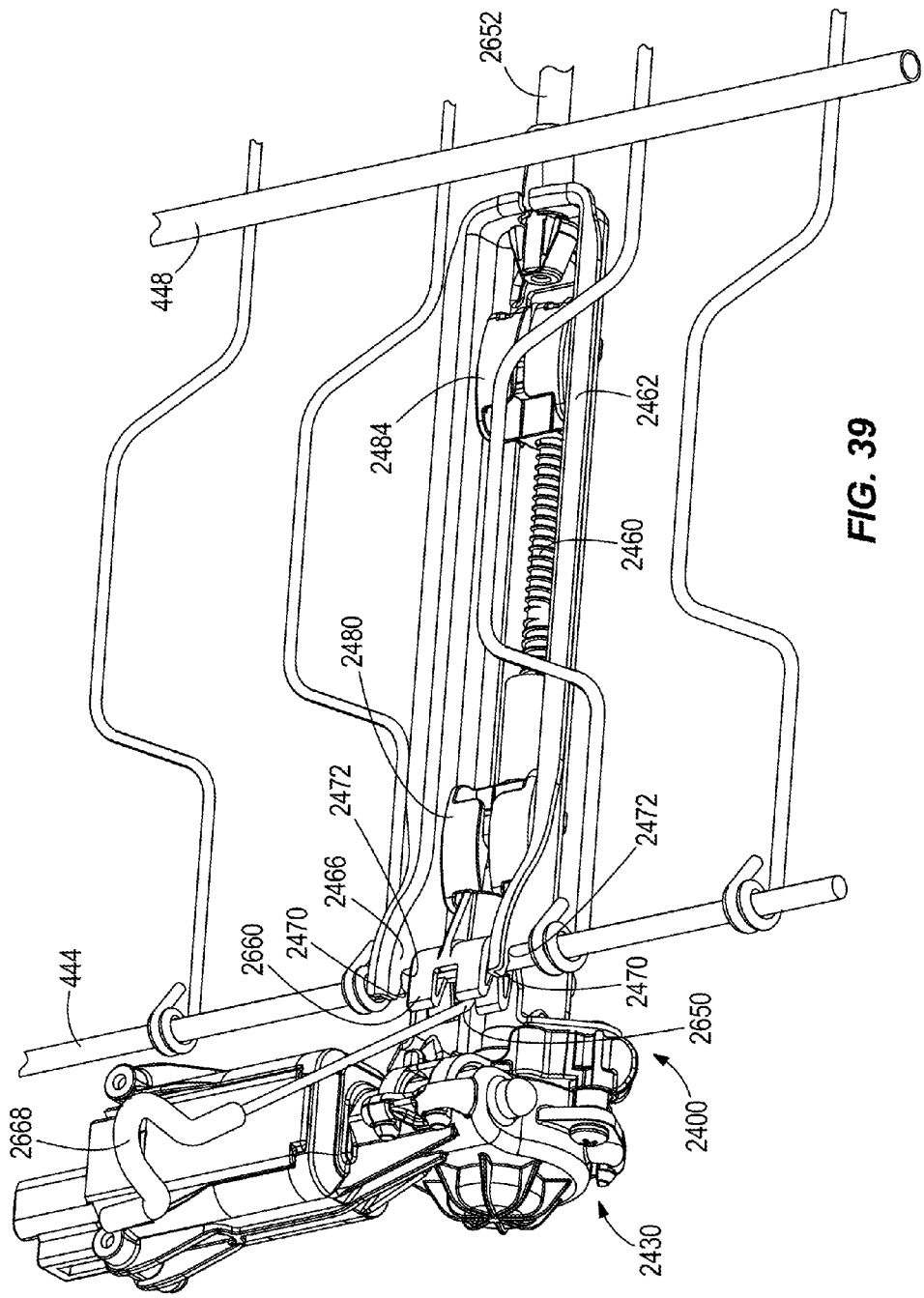
FIG. 39 is a partial front perspective view of the lumbar support system of FIG. 38.

FIGS. 38-39 illustrate another lumbar support system 2400 for use with a seat such as seat 410 illustrated in FIG. 6 having a contour mat or flexmat 440. The lumbar support system 2400 is similar to the lumbar support system 2100 with certain differences hereinafter described.

A drive assembly, or actuator 2430 is substantially similar to actuator 2330 and need not be further detailed. A threaded member, or spindle 2460 coupled to the drive shaft of the actuator 2430 spans a substantial portion of a spindle rail 2462. The spindle rail 2462 includes an attachment bracket or portion 2466 near the actuator 2430 with first and second slots 2470, best shown in FIG. 39. The inner circumference 2472 of one or both of the slots 2470 is lined with a plurality of continuous or noncontinuous burrs, ridges, or similar projections. In one embodiment, the outer wires 444 of the flexmat 440 include a thin coating of nylon or a nylon equivalent, which may be on the order of approximately 0.4 mm in thickness. During assembly, and specifically during the coupling of the attachment portion 2466 to the associated outer wire 444, the attachment portion 2466 is positioned to bring the slots 2470 into contact with the wire 444, i.e., snapped into place, such that the burrs on an inner circumference 2472 "bite" into the coating. This coupling between the attachment portion 2466 and the outer wire 444 permits rotation of the spindle rail 2462 about the outer wire 444, but hinders movement of the spindle rail 2462 along the outer wire 444. Moreover, the attachment portion 2466 can be uncoupled from the outer wire 444 and moved to another position along the length of the outer wire 444 and re-coupled, without the use of additional tools or tooling, in order to adjust the position of the support system 2400 with respect to the flexmat 440 and the seat 410.

The spindle 2460 has right-hand proximal threads and left-hand distal threads and corresponding proximal and distal sliders 2480, 2484. A bumper 2508 located adjacent the drive shaft of the actuator 2430 provides a first travel limit for the proximal slider 2480. A spacer 2512 having a proximal end 2514 and a distal end 2516 is positioned about the spindle 2460 between the sliders 2480, 2484. The spacer 2512 is identical to the spacer 2312 and is configured to "float" over the spindle 2460 while establishing a second limit of travel and defines the range of movement for the sliders 2480, 2484.

Proximal and distal cables 2620, 2624 are coupled to the proximal slider 2480 and the distal slider 2584, respectively. Each cable 2620, 2624 includes a cable body 2638 and is coupled to a respective slider 2480, 2484. An intermediate section 2650 of the distal cable 2624 is longer than a corresponding intermediate section 2650 of the proximal cable 2620. As illustrated, a portion of this longer section of the cable 2624 is situated within a rigid sleeve 2652 having an inside diameter larger than the diameter of the cable 2624 to permit free movement of the cable 2624 within. Portions of the proximal and distal cables 2620, 2624 each pass through and are contained by a clip 2660 coupling the proximal and distal cables 2620, 2624 to the flexmat 440 through the outer wires 444. The cables 2620, 2624 each terminate at a hook fitting 2668, itself secured to a respective vertical support member 434, 438 of the frame 426 (see FIG. 6).

The mounting of the spindle rail 2462 through the attachment portion 2466 and of the clips 2660 to the flexmat 440 as previously described serves as the only manner of fastening the aforementioned components of the lumbar support system 2400 to the vehicle.

A seat occupant activates the actuator 2430 for the lumbar support system 2400 using an electrically actuated switch located preferably adjacent the seat backrest 418 or the seat bottom 414. The system 2400 can be in any position between a fully refracted position and a fully extended position when the actuator 2430 is initiated. Energization of the actuator 2430 turns the spindle 2460 in the same manner as the actuator 2230 turns the spindle 2260 to translate the sliders 2480, 2484. As the sliders 2480, 2484 converge, the intermediate sections 2650 contact the lateral outer wires 444, forcing the flexmat 440 frontward. During the initial movement of the proximal slider 2480 in the distal direction, the proximal slider 2480 contacts the proximal end 2514 of the spacer 2512 and concurrently moves the spacer 2512 distally. When the distal end 2516 of the spacer 2512 contacts the distal slider 2484, the actuator 2430 stops, ceasing rotation of the spindle 2460. The hook ends 2668 allow for coupled rotation about the vertical support members 434, 438 to permit smooth movement of the lumbar support system 2400 as it travels forward.

Because the spindle rail 2462 is not coupled to the central wire 448 of the flexmat 440 but rotatable about the attached outer wire 444, the central wire 448 is allowed to "flex" more during operation and the user is less inclined to feel the presence of the spindle rail 2462.

To retract the lumbar support system 2400 to lessen the amount of lumbar support, the seat occupant activates the actuator 2430 for counterclockwise rotation of the spindle 2460, which causes the proximal slider 2480 to travel proximally and the distal slider 2484 to travel distally. As the sliders 2480, 2484 grow farther apart, pressure against the lateral outside wires 444 from the intermediate sections 2650 of the cables 2620, 2624 lessens and the flexmat 440 retracts rearwardly. When the proximal slider 2480 contacts the bumper 2508, the motor 534 stops, as previously described.

As with the lumbar support system 2100, during the course of travel of the contour mat 440, the cables 2620, 2624 remain disposed in substantially the same plane from retraction to extension and back, and the angle β (see, e.g., FIG. 9) between a first end and a second end of each cable 2620, 2624 remains obtuse.

Figure 40:
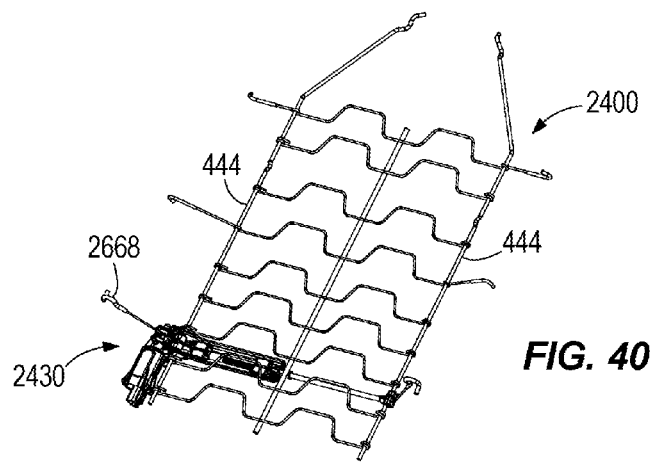
FIGS. 40-42 are perspective views of three additional orientations of the lumbar support system of FIG. 38.
Figure 41:
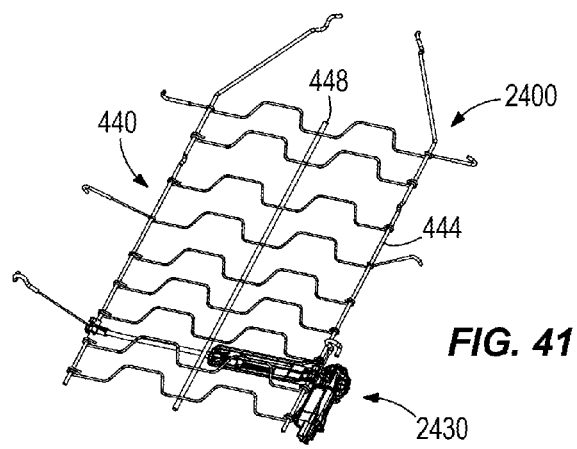
Figure 42:
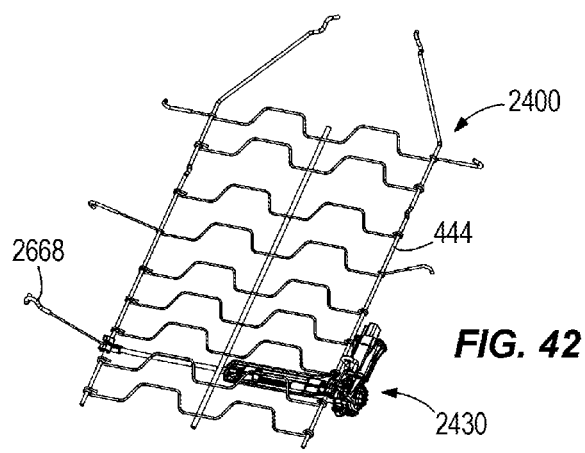

FIGS. 40-42 illustrate the modular nature of the lumbar support system 2400. The flexmat 440 is configured to support the spindle rail 2462 at either of the outer wires 444, and the actuator 2430 is mountable to the spindle rail 2462 in two possible orientations. Thus, as shown, the system 2400 can be configured four possible ways depending on the vehicle parameters or constraints for a particular application.

The components of the lumbar support systems of FIGS. 1, 6, 13, 14, 22, 27, 32, and 38 can be constructed from metal, plastic, or a combination of the two, e.g., the spindles 260, 560, 860, 1150, 1450, 1452, 2260, 2460 and spindle rails 192, 562, 862, 2192, 2462 can be formed from a metal, such as aluminum, with the remaining components formed from a plastic.

Various features and advantages of the invention are set forth in the following claims.

What is claimed is:

1. A lumbar support system for a seat backrest, the system comprising:
    a fixed frame;
    a lumbar support coupled to the fixed frame, the lumbar support movable from a first position to a second position;
    a motor coupled to the lumbar support;
    a threaded member operatively engaged with the motor such that the motor rotates the threaded member about an axis;
    a first traveling member engaged with the threaded member;
    a second traveling member engaged with the threaded member, wherein rotation of the threaded member translates the first and second traveling members in opposite axial directions along the threaded member;
    a spacer positioned between the first traveling member and the second traveling member, the spacer configured to slide over the threaded member;
    a first flexible cable having a first end coupled to the first traveling member for movement therewith, a second end coupled to the fixed frame, and an intermediate portion operatively associated with the lumbar support; and
    a second flexible cable having a first end coupled to the second traveling member for movement therewith, a second end coupled to the fixed frame, and an intermediate portion operatively associated with the lumbar support, wherein the intermediate portion of the first flexible cable and the intermediate portion of the second flexible cable operate to move the lumbar support from the first position to the second position in response to translation of the first and second traveling members.

2. The lumbar support system of claim 1, wherein the lumbar support is a contour mat.

3. The lumbar support system of claim 1, wherein the fixed frame includes vertical members, and wherein the lumbar support is a basket positioned between the vertical support members.

4. The lumbar support system of claim 1, further including a spring disposed between the second end of one of the first or second flexible cables and the fixed frame.

5. The lumbar support system of claim 1, further including a hinge disposed between and coupled to the lumbar support and to the fixed frame.

6. The lumbar support system of claim 5, wherein the hinge pivots in response to movement of the lumbar support from the first position to the second position.

7. The lumbar support system of claim 5, further including a coupling disposed between the hinge and the fixed frame.

8. The lumbar support system of claim 1, wherein the first flexible cable and the second flexible cable are disposed in substantially the same plane during movement of the lumbar support from the first position to the second position.

9. The lumbar support system of claim 1, wherein a portion of one of the first flexible cable and the second flexible cable travels within a sleeve adjacent the lumbar support.

10. The lumbar support system of claim 1, wherein the first flexible cable forms an angle between the first and second ends that remains obtuse during movement of the lumbar support from the first position to the second position.

11. An adjustable support system for a seat having a fixed frame, the adjustable support system comprising:
    a support movable from a first position to a second position relative to the frame;
    an actuator coupled to only the support and configured to move the support between the first and second positions;
    a member operatively associated with and movable by the actuator, wherein the member has a length; and
    a flexible cable having a first end and a second end, the first end coupled to the member for travel along the length of the member and the second end coupled to the fixed frame such that movement of the member by the actuator causes the flexible cable to move the support between the first position and the second position.

12. The adjustable support system of claim 11, wherein movement of the member by the actuator causes the first end of the flexible cable to travel along the length of the member.

13. The adjustable support system of claim 11, wherein upon actuation of the actuator contact between the support and a portion of the flexible cable intermediate the first and second ends moves the support from the first position to the second position.

14. The adjustable support system of claim 11, further comprising a traveling member operatively associated with the member for movement along the length of the member when the actuator moves the member, wherein the first end of the flexible cable is coupled to the traveling member.

* * * * *